United States Patent
Kim et al.

(10) Patent No.: US 10,652,886 B2
(45) Date of Patent: May 12, 2020

(54) METHOD FOR TRANSMITTING AND RECEIVING UPLINK SIGNAL AND APPARATUS SUPPORTING METHOD IN WIRELESS COMMUNICATION SYSTEM SUPPORTING NON-LICENSED BAND

(71) Applicant: LG ELECTRONICS INC., Seoul (KR)

(72) Inventors: Seonwook Kim, Seoul (KR); Joonkui Ahn, Seoul (KR); Suckchel Yang, Seoul (KR); Yunjung Yi, Seoul (KR); Jonghyun Park, Seoul (KR); Youngtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/070,686

(22) PCT Filed: Jan. 20, 2017

(86) PCT No.: PCT/KR2017/000722
§ 371 (c)(1),
(2) Date: Jul. 17, 2018

(87) PCT Pub. No.: WO2017/126936
PCT Pub. Date: Jul. 27, 2017

(65) Prior Publication Data
US 2019/0053229 A1   Feb. 14, 2019

Related U.S. Application Data

(60) Provisional application No. 62/281,151, filed on Jan. 20, 2016.

(51) Int. Cl.
*H04W 72/04* (2009.01)
*H04W 74/06* (2009.01)
(Continued)

(52) U.S. Cl.
CPC ... *H04W 72/0446* (2013.01); *H04W 74/0808* (2013.01); *H04W 28/08* (2013.01)

(58) Field of Classification Search
CPC ......... H04W 72/0446; H04W 74/0808; H04W 28/08
See application file for complete search history.

(56) References Cited

U.S. PATENT DOCUMENTS

2013/0188564 A1* 7/2013 Yu ............... H04W 72/1247
                                                370/329
2014/0211672 A1   7/2014 Klatt
(Continued)

FOREIGN PATENT DOCUMENTS

| JP | 2013-102398 A | 5/2013 |
|---|---|---|
| KR | 10-2014-0035506 A | 3/2014 |
| WO | WO 2015/094816 A1 | 6/2015 |

OTHER PUBLICATIONS

Zhang et al., "LTE-Unlicensed: The Future of Spectrum Aggregation for Cellular Networks," IEEE Wireless Communications, vol. 22, Issue 3, Jul. 6, 2015, pp. 150-159 (11 pages).

*Primary Examiner* — Brian D Nguyen
(74) *Attorney, Agent, or Firm* — Birch, Stewart, Kolasch & Birch, LLP

(57) ABSTRACT

Disclosed are a method for a terminal for transmitting and receiving an uplink signal between a base station and a terminal, and an apparatus supporting the method in a licensed assisted access (LAA) system in which a base station or a terminal transmits listen-before-talk (LBT)-based signals. Specifically, the present invention discloses a method for a terminal for transmitting uplink data to a base station, a method for transmitting a modulated reference signal for the uplink data, and an apparatus for supporting the methods.

18 Claims, 27 Drawing Sheets

(51) Int. Cl.
*H04W 74/08* (2009.01)
*H04W 28/08* (2009.01)

(56) References Cited

U.S. PATENT DOCUMENTS

| | | | |
|---|---|---|---|
| 2015/0257184 A1* | 9/2015 | Yamazaki | H04W 76/14 370/329 |
| 2016/0192337 A1* | 6/2016 | Wengerter | H04L 1/001 370/329 |
| 2017/0318586 A1* | 11/2017 | Wang | H04W 72/0453 |
| 2018/0205525 A1* | 7/2018 | He | H04L 1/1861 |
| 2018/0263056 A1* | 9/2018 | Oh | H04L 5/005 |

* cited by examiner

FIG. 9
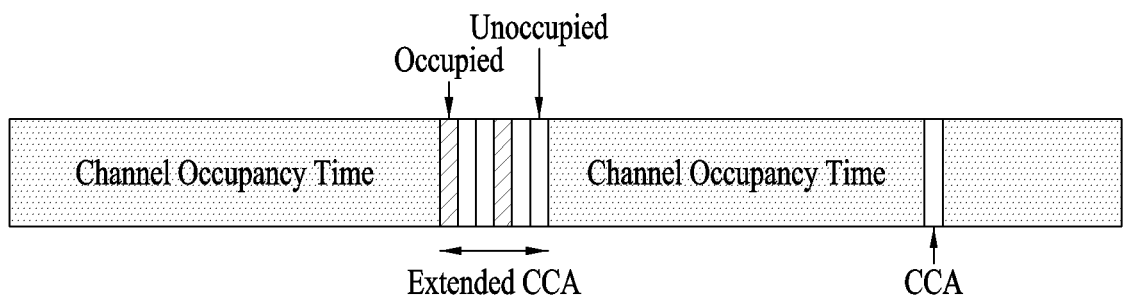
(a)
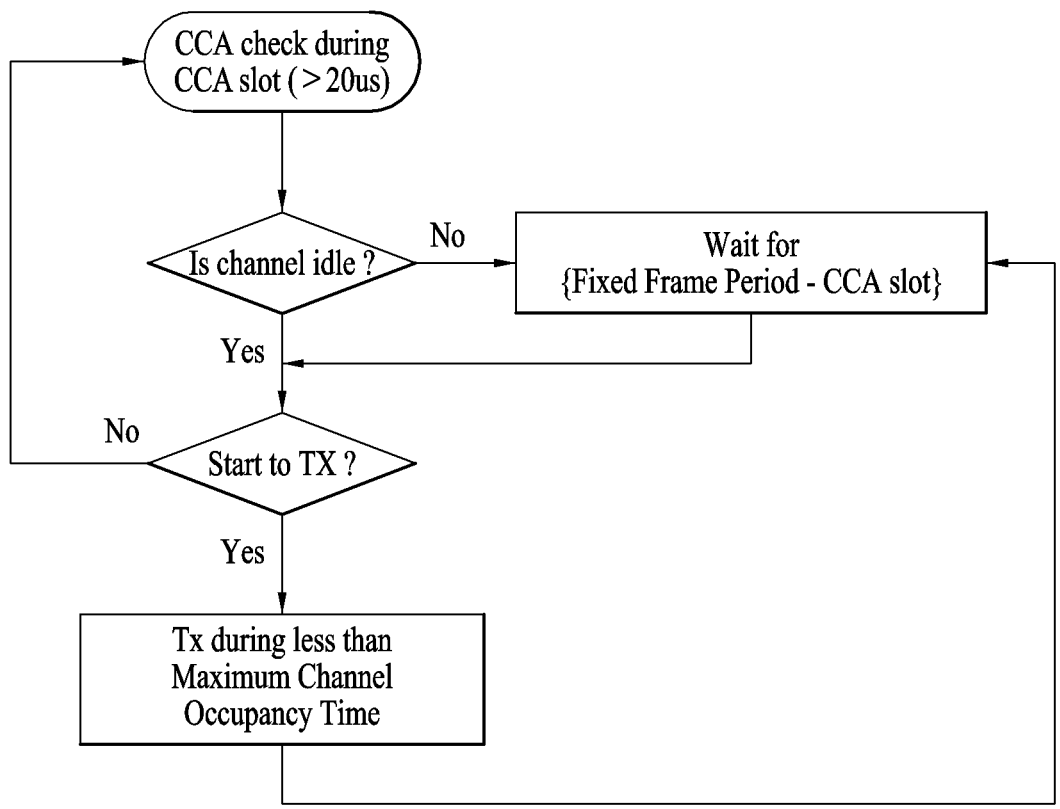
(b)

US 10,652,886 B2

METHOD FOR TRANSMITTING AND RECEIVING UPLINK SIGNAL AND APPARATUS SUPPORTING METHOD IN WIRELESS COMMUNICATION SYSTEM SUPPORTING NON-LICENSED BAND

CROSS REFERENCE TO RELATED APPLICATIONS

This application is the National Phase of PCT International Application No. PCT/KR2017/000722, filed on Jan. 20, 2017, which claims priority under 35 U.S.C. 119(e) to U.S. Provisional Application No. 62/281,151, filed on Jan. 20, 2016, all of which are hereby expressly incorporated by reference into the present application.

TECHNICAL FIELD

Following description relates to a wireless communication system supporting an unlicensed band, and more particularly, to a method of transmitting and receiving an uplink signal between a UE and a base station in a wireless communication system supporting an unlicensed band and apparatuses supporting the method.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Tasks

An object of the present invention is to provide a method for a UE to transmit uplink data and a demodulation reference signal to a base station when the base station or the UE performs an LBT (listen-before-talk)-based signal transmission.

In particular, an object of the present invention is to provide a method of solving a regional or a national regulation that it is necessary to occupy a system bandwidth as much as a ratio equal to or greater than a certain ratio to transmit uplink data via an unlicensed band. In addition, an object of the present invention is to provide a method for a UE to transmit uplink data and a demodulation reference signal for the uplink data to a base station.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method of transmitting and receiving an uplink signal between a UE and a base station in a wireless communication system supporting an unlicensed band and apparatuses supporting the method.

To achieve these and other advantages and in accordance with the purpose of the present invention, as embodied and broadly described, according to one embodiment, a method of transmitting an uplink signal, which is transmitted by a user equipment (UE) to a base station in a wireless communication system supporting an unlicensed band, includes the step of transmitting an uplink data on a first time interval (e.g., subframe) including two second time intervals (e.g., slots), wherein each of the second time intervals comprises two third time intervals (e.g., half slots) distinguished from each other on the basis of a symbol in which a demodulation reference signal is transmitted, wherein the uplink data is transmitted via frequency resources different from each other in the two third time intervals included in each of the second time intervals, and transmitting a demodulation reference signal on the symbol in which the demodulation reference signal is transmitted in each of the second time interval, wherein a frequency resource in which the demodulation reference signal is transmitted in each of the second time interval is determined based on a frequency resource in which the uplink data is transmitted in each of the second time interval, and wherein the frequency resource in which the demodulation reference signal is transmitted in each of the second time interval may correspond to a partial frequency band among a system bandwidth.

To further achieve these and other advantages and in accordance with the purpose of the present invention, according to a different embodiment, a method of receiving an uplink signal, which is received by a base station from a user equipment (UE) in a wireless communication system supporting an unlicensed band, includes the step of receiving an uplink data on a first time interval (e.g., subframe) including two second time intervals (e.g., slots), wherein each of the second time intervals comprises two third time intervals (e.g., half slots) distinguished from each other on the basis of a symbol in which a demodulation reference signal is transmitted, wherein, the uplink data is transmitted via frequency resources different from each other in the two third time intervals included in each of the second time intervals, and receiving a demodulation reference signal on the symbol in which the demodulation reference signal is transmitted in each of the second time intervals, wherein a frequency resource in which the demodulation reference signal is transmitted in each of the second time intervals is determined based on a frequency resource in which the uplink data is transmitted in each of the second time intervals, and the frequency resource in which the demodulation reference signal is transmitted in each of the second time intervals may correspond to a partial frequency band among a system bandwidth.

To further achieve these and other advantages and in accordance with the purpose of the present invention, according to a further different embodiment, a user equipment transmitting an uplink signal to a base station in a wireless communication system supporting an unlicensed band includes a transmitter, and a processor configured to operate in a manner of being connected with the transmitter, the processor configured to transmit an uplink data via a first time interval (e.g., subframe) including two second time intervals (e.g., slots), wherein each of the second time intervals comprises two third time intervals (e.g., half slots) distinguished from each other on the basis of a symbol in which a demodulation reference signal is transmitted, wherein the uplink data is transmitted via frequency resources different from each other in the two third time intervals included in each of the second time intervals, the processor configured to transmit a demodulation reference signal on the symbol in which the demodulation reference signal is transmitted in each of the second time intervals, wherein a frequency resource in which the demodulation reference signal is transmitted in each of the second time intervals is determined based on a frequency resource in which the uplink data is transmitted in each of the second time intervals, and the frequency resource in which the demodulation reference signal is transmitted in each of the second time intervals may correspond to a partial frequency band among a system bandwidth.

To further achieve these and other advantages and in accordance with the purpose of the present invention, according to a further different embodiment, a base station receiving an uplink signal from a user equipment (UE) in a wireless communication system supporting an unlicensed band includes a receiver, and a processor configured to operate in a manner of being connected with the receiver, the processor configured to receive an uplink data on a first time interval (e.g., subframe) including two second time intervals (e.g., slots), wherein each of the second time intervals comprises two third time intervals (e.g., half slots) distinguished from each other on the basis of a symbol in which a demodulation reference signal is transmitted, wherein the uplink data is transmitted via frequency resources different from each other in the two third time intervals included in each of the second time intervals, the processor configured to receive a demodulation reference signal on the symbol in which the demodulation reference signal is transmitted in each of the second time intervals, wherein a frequency resource in which the demodulation reference signal is transmitted in each of the second time intervals is determined based on a frequency resource in which the uplink data is transmitted in each of the second time intervals, and the frequency resource in which the demodulation reference signal is transmitted in each of the second time intervals may correspond to a partial frequency band among a system bandwidth.

For example, the system bandwidth comprises a plurality of subbands and the uplink data can be transmitted via different subbands in each of the third time intervals in each of the second time intervals.

In this case, the demodulation reference signal in each of the second time intervals can be transmitted via a frequency resource identical to the frequency resource in which the uplink data in each of the second time intervals is transmitted.

As a different example, the system bandwidth comprises a plurality of subbands and the uplink data can be transmitted via a partial frequency band among subbands different from each other per each of the third time intervals in each of the second time intervals.

In this case, the demodulation reference signal in each of the second time intervals can be transmitted via a frequency resource identical to one or more subbands including the frequency resource in which the uplink data in each of the second time intervals is transmitted.

And, the demodulation reference signal in each of the second time intervals can be transmitted by power which is boosted according to a ratio of a partial frequency band in which the demodulation reference signal in each of the second time intervals is transmitted among the system bandwidth.

And, the uplink data can be transmitted in a manner of being spanned over the system bandwidth with a ratio equal to or greater than a prescribed ratio in the subframe.

And, if the demodulation reference signal is overlapped with a demodulation reference signal transmitted by a different UE in a time resource and a frequency resource, the demodulation reference signal can be distinguished from the demodulation reference signal transmitted by the different UE via an OCC (orthogonal cover code).

And, the uplink data and the demodulation reference signal in each of the second time intervals can be transmitted on an unlicensed band.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

As is apparent from the above description, the embodiments of the present disclosure have the following effects.

First of all, according to the present invention, it is able to transmit and receive uplink data while a regional or a national regulation is satisfied in a wireless access system supporting an unlicensed band.

Secondly, when a UE transmits an uplink signal via an unlicensed band, it is able to provide a method of transmitting a demodulation reference signal together with the uplink signal.

Effects obtainable from the present invention are non-limited by the above mentioned effect. And, other unmentioned effects can be clearly understood from the following description by those having ordinary skill in the technical field to which the present invention pertains. That is, effects which are not intended by the present invention may be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

FIG. 9 is a diagram illustrating an exemplary Load Based Equipment (LBE) operation as one of the LBT operations;

BEST MODE

Mode for Invention

Figure 1:
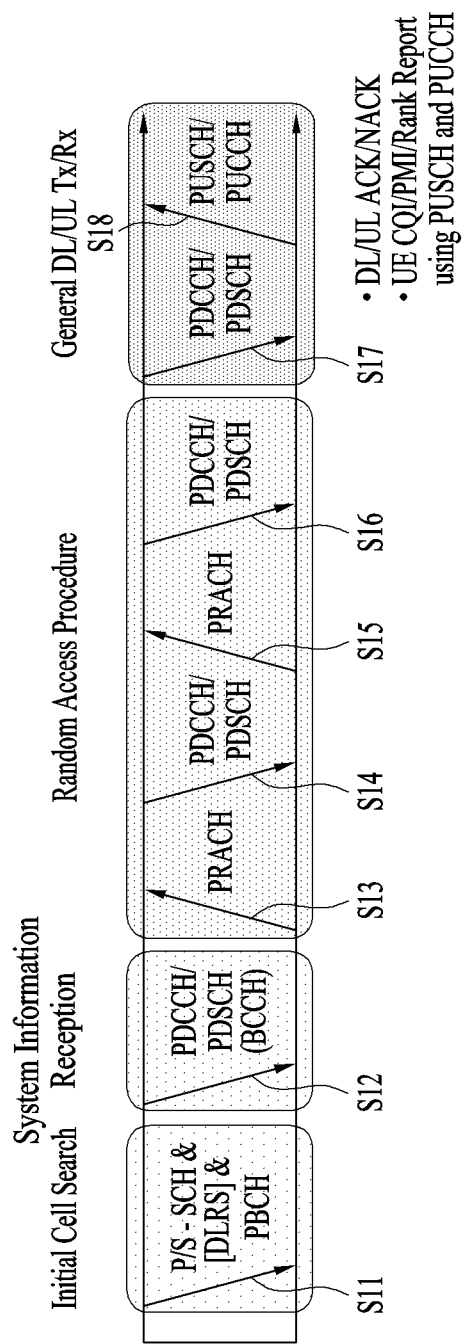
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
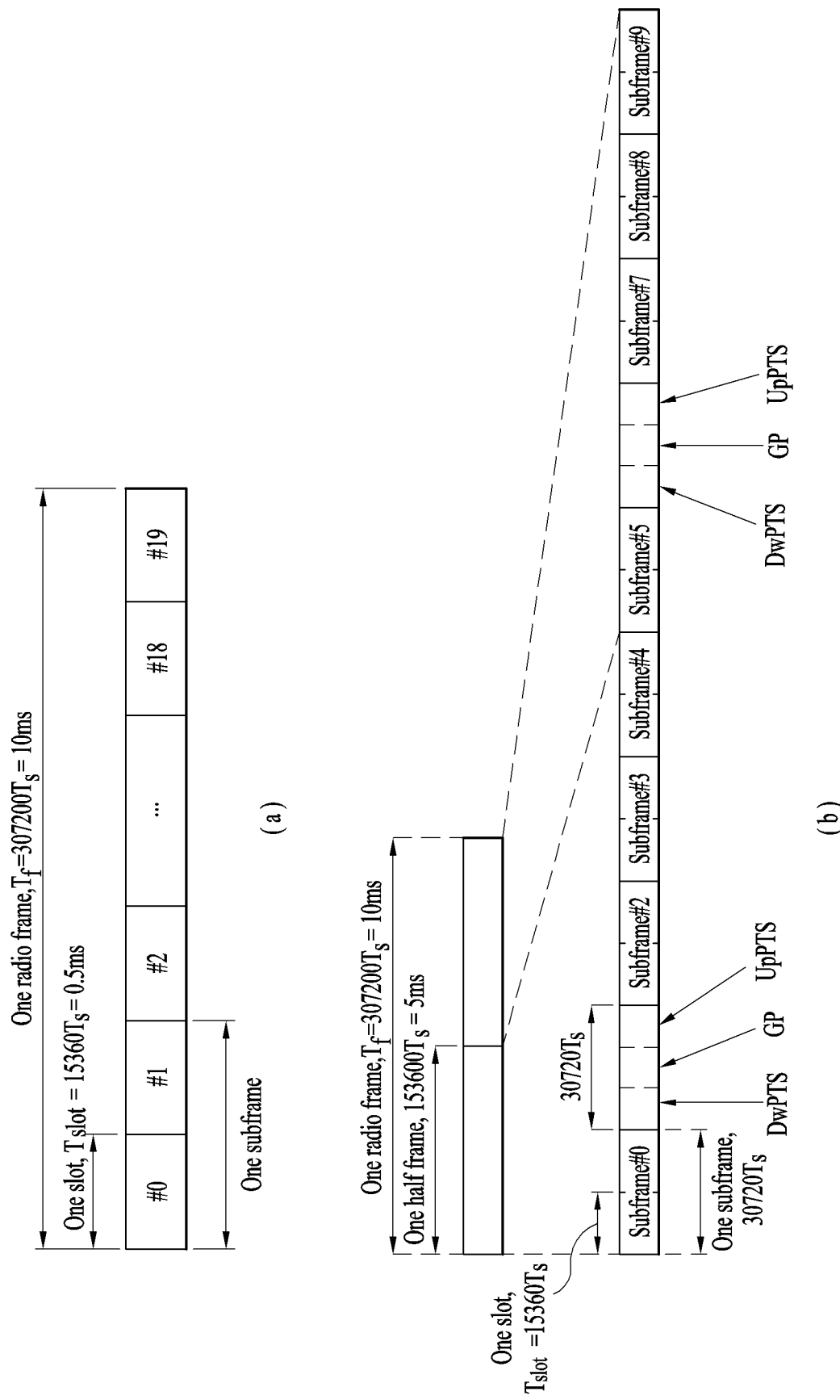
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

Figure 5:
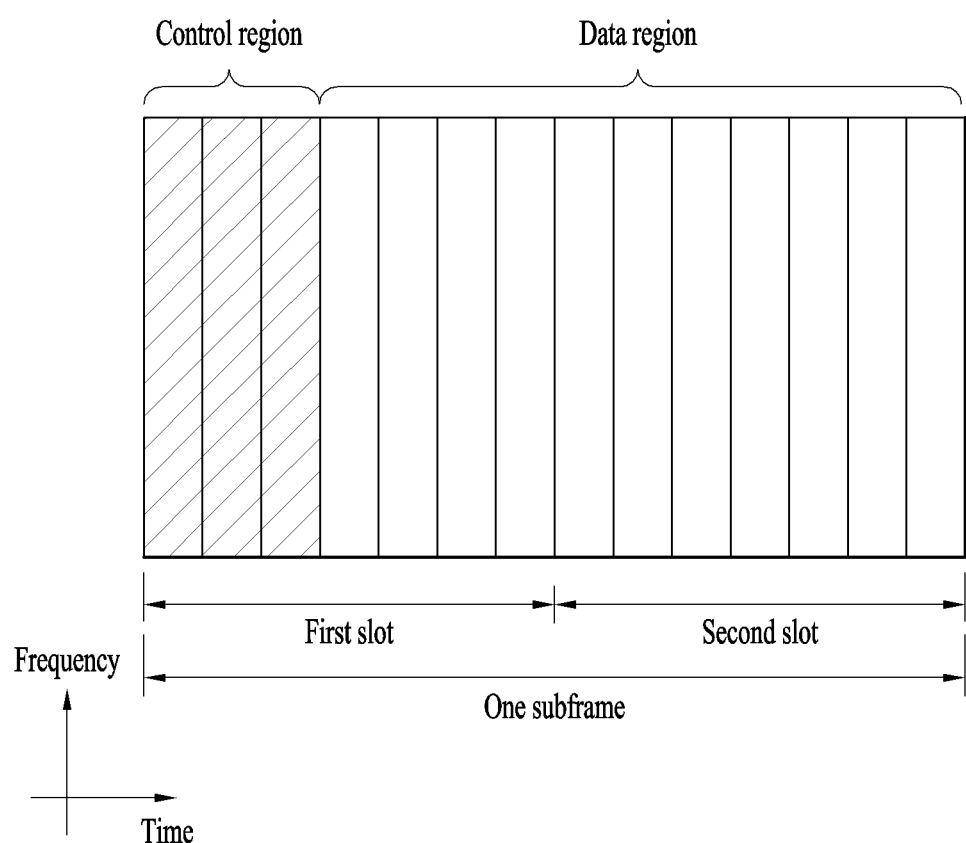
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
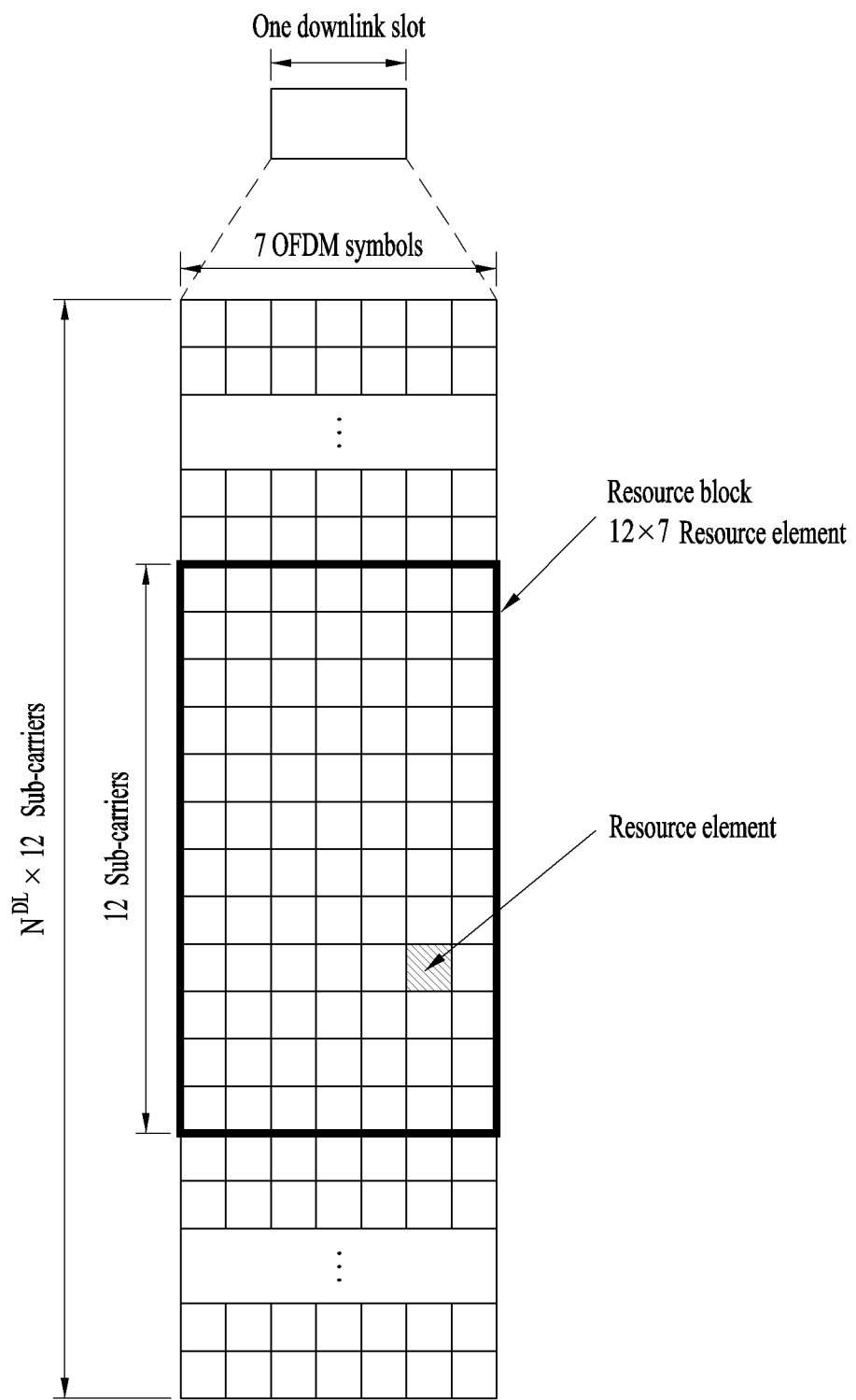
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A structure of an uplink slot may be identical to a structure of a downlink slot.

Figure 4:
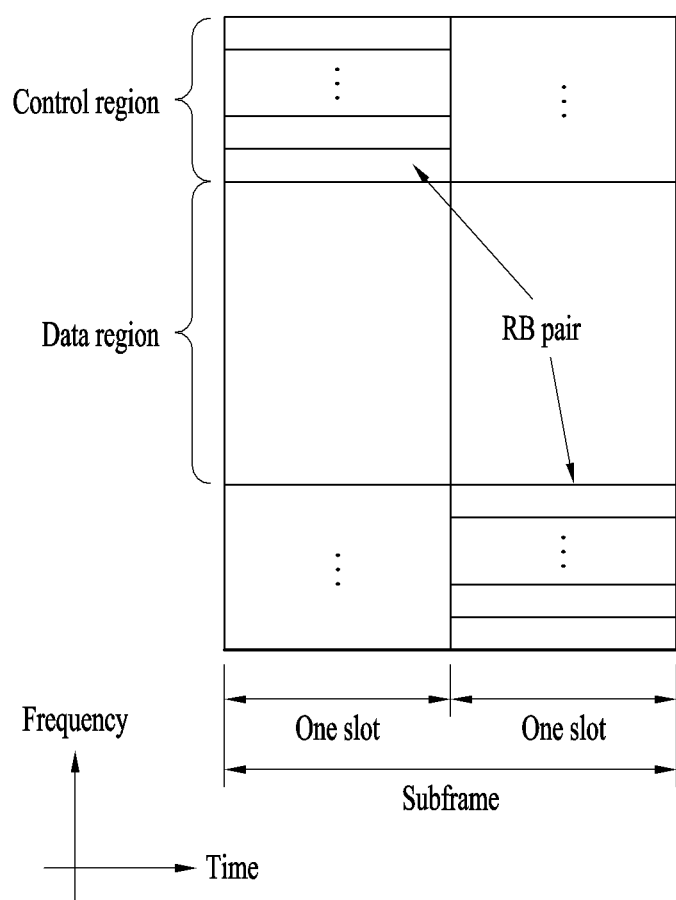
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe is allocated to a PUCCH for a UE. The RBs of the RB pair occupy different subcarriers in two slots. Thus it is said that the RB pair frequency-hops over a slot boundary.

2. LTE-U System 2.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band. LTE-A system operating on an unlicensed band is referred to as LAA (Licensed Assisted Access) and the LAA may correspond to a scheme of performing data transmission/reception in an unlicensed band using a combination with a licensed band.

Figure 6:
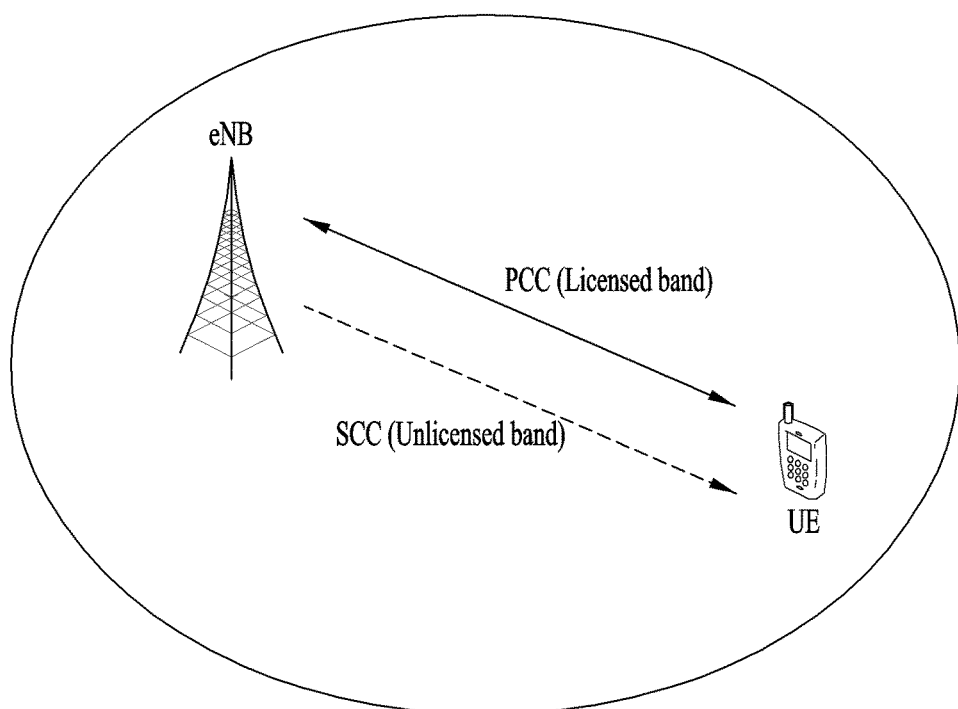
FIG. 6 is a diagram illustrating an exemplary CA environment supported in an LTE-Unlicensed (LTE-U) system.

FIG. 6 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 6, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 6 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

2.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 7:
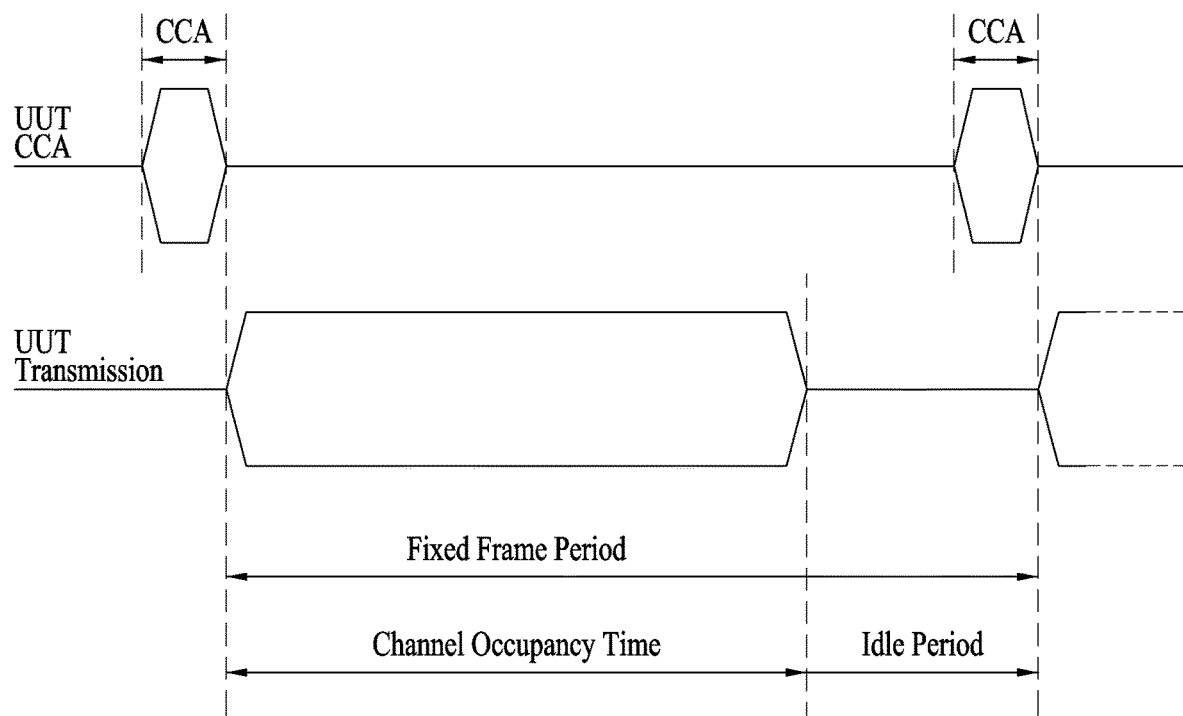
FIG. 7 is a diagram illustrating an exemplary Frame Based Equipment (FBE) operation as one of Listen-Before-Talk (LBT) operations.

FIG. 7 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 μs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 8:
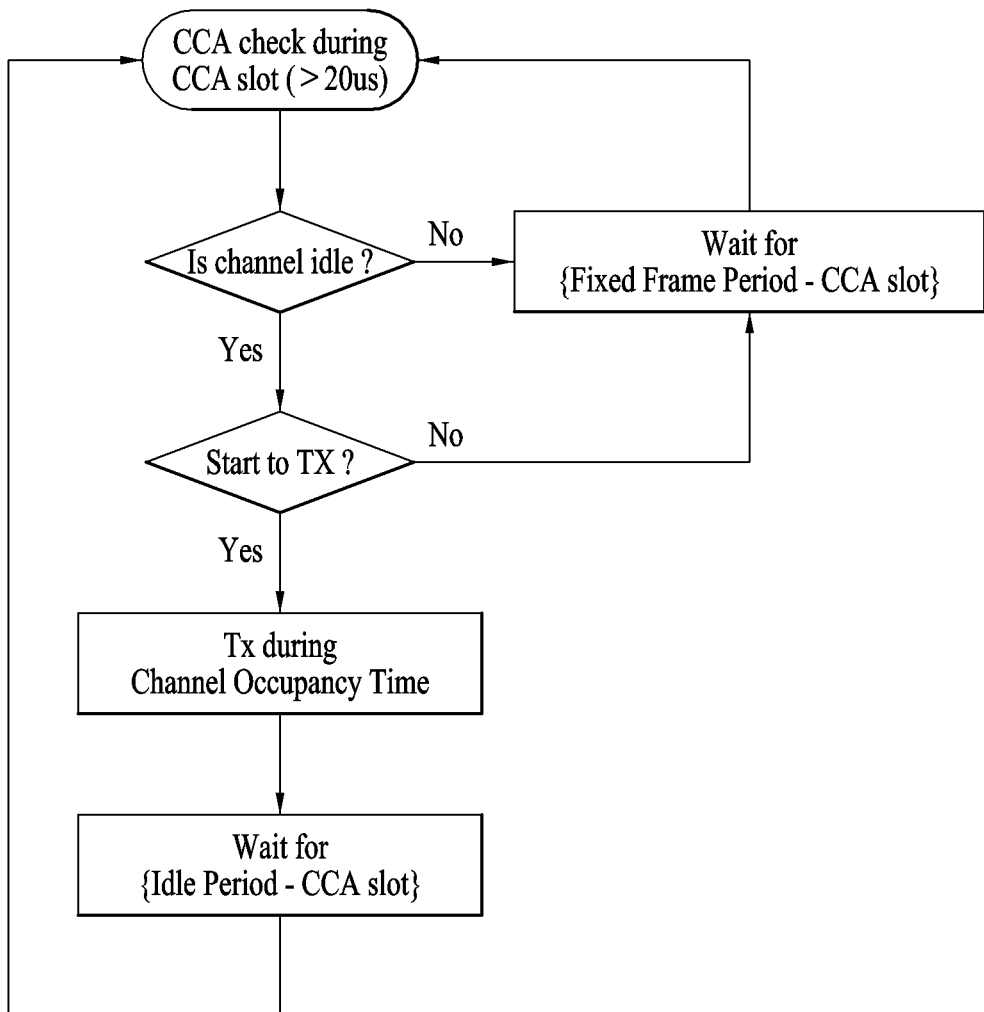
FIG. 8 is a block diagram illustrating the FBE operation.

FIG. 8 is a block diagram illustrating the FBE operation.

Referring to FIG. 8, a communication node (i.e., eNB) managing an SCell performs CCA during a CCA slot. If the channel is idle, the communication node performs data transmission (Tx). If the channel is busy, the communication node waits for a time period calculated by subtracting the CCA slot from a fixed frame period, and then resumes CCA.

The communication node transmits data during the channel occupancy time. Upon completion of the data transmission, the communication node waits for a time period calculated by subtracting the CCA slot from the idle period, and then resumes CCA. If the channel is idle but the communication node has no transmission data, the communication node waits for the time period calculated by subtracting the CCA slot from the fixed frame period, and then resumes CCA.

FIG. 9 is a view illustrating an exemplary LBE operation as one of the LBT operations.

Referring to FIG. 9(a), in LBE, the communication node first sets q (q∈{4, 5, . . . , 32}) and then performs CCA during one CCA slot.

FIG. 9(b) is a block diagram illustrating the LBE operation. The LBE operation will be described with reference to FIG. 9(b).

The communication node may perform CCA during a CCA slot. If the channel is unoccupied in a first CCA slot, the communication node may transmit data by securing a time period of up to $(13/32)q$ ms.

On the contrary, if the channel is occupied in the first CCA slot, the communication node selects N (N∈{1, 2, . . . , q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to $(13/32)q$ ms.

2.3 Discontinuous Transmission in DL

When discontinuous transmission is performed on an unlicensed carrier having a limited maximum transmission period, the discontinuous transmission may influence on several functions necessary for performing an operation of LTE system. The several functions can be supported by one or more signals transmitted at a starting part of discontinuous LAA DL transmission. The functions supported by the signals include such a function as AGC configuration, channel reservation, and the like.

When a signal is transmitted by an LAA node, channel reservation has a meaning of transmitting signals via channels, which are occupied to transmit a signal to other nodes, after channel access is performed via a successful LBT operation.

The functions, which are supported by one or more signals necessary for performing an LAA operation including discontinuous DL transmission, include a function for detecting LAA DL transmission transmitted by a UE and a function for synchronizing frequency and time. In this case, the requirement of the functions does not mean that other available functions are excluded. The functions can be supported by other methods.

2.3.1 Time and Frequency Synchronization

A design target recommended by LAA system is to support a UE to make the UE obtain time and frequency synchronization via a discovery signal for measuring RRM (radio resource management) and each of reference signals included in DL transmission bursts, or a combination thereof. The discovery signal for measuring RRM transmitted from a serving cell can be used for obtaining coarse time or frequency synchronization.

2.3.2 DL Transmission Timing

When a DL LAA is designed, it may follow a CA timing relation between serving cells combined by CA, which is defined in LTE-A system (Rel-12 or earlier), for subframe boundary adjustment. Yet, it does not mean that a base station starts DL transmission only at a subframe boundary. Although all OFDM symbols are unavailable in a subframe, LAA system can support PDSCH transmission according to a result of an LBT operation. In this case, it is required to support transmission of control information necessary for performing the PDSCH transmission.

2.4 Measuring and Reporting RRM

LTE-A system can transmit a discovery signal at a start point for supporting RRM functions including a function for detecting a cell. In this case, the discovery signal can be referred to as a discovery reference signal (DRS). In order to support the RRM functions for LAA, the discovery signal of the LTE-A system and transmission/reception functions of the discovery signal can be applied in a manner of being changed.

2.4.1 Discovery Reference Signal (DRS)

A DRS of LTE-A system is designed to support on/off operations of a small cell. In this case, off small cells correspond to a state that most of functions are turned off except a periodic transmission of a DRS. DRSs are transmitted at a DRS transmission occasion with a period of 40, 80, or 160 ms. A DMTC (discovery measurement timing configuration) corresponds to a time period capable of anticipating a DRS received by a UE. The DRS transmission occasion may occur at any point in the DMTC. A UE can anticipate that a DRS is continuously transmitted from a cell allocated to the UE with a corresponding interval.

If a DRS of LTE-A system is used in LAA system, it may bring new constraints. For example, although transmission of a DRS such as a very short control transmission without LBT can be permitted in several regions, a short control transmission without LBT is not permitted in other several regions. Hence, a DRS transmission in the LAA system may become a target of LBT.

When a DRS is transmitted, if LBT is applied to the DRS, similar to a DRS transmitted in LTE-A system, the DRS may not be transmitted by a periodic scheme. In particular, it may consider two schemes described in the following to transmit a DRS in the LAA system.

As a first scheme, a DRS is transmitted at a fixed position only in a DMTC configured on the basis of a condition of LBT.

As a second scheme, a DRS transmission is permitted at one or more different time positions in a DMTC configured on the basis of a condition of LBT.

As a different aspect of the second scheme, the number of time positions can be restricted to one time position in a subframe. If it is more profitable, DRS transmission can be permitted at the outside of a configured DMTC as well as DRS transmission performed in the DMTC.

Figure 10:
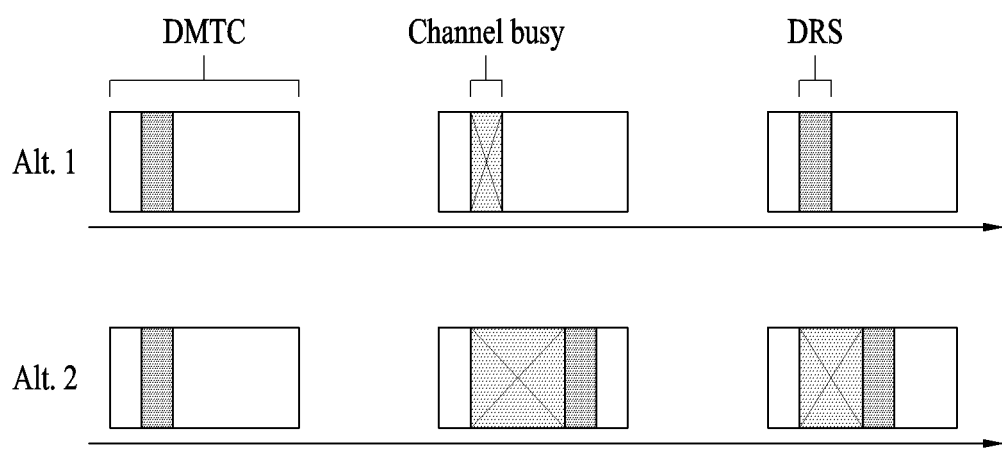
FIG. 10 is a diagram for explaining methods of transmitting a DRS supported in an LAA system.

FIG. 10 is a diagram for explaining DRS transmission methods supported by LAA system.

Referring to FIG. 10, the upper part of FIG. 10 shows the aforementioned first scheme for transmitting a DRS and the bottom part of FIG. 10 shows the aforementioned second scheme for transmitting a DRS. In particular, in case of the first scheme, a UE can receive a DRS at a position determined in a DMTC period only. On the contrary, in case of the second scheme, a UE can receive a DRS at a random position in a DMTC period.

In LTE-A system, when a UE performs RRM measurement based on DRS transmission, the UE can perform single RRM measurement based on a plurality of DRS occasions. In case of using a DRS in LAA system, due to the constraint of LBT, it is difficult to guarantee that the DRS is transmitted at a specific position. Even though a DRS is not actually transmitted from a base station, if a UE assumes that the DRS exists, quality of an RRM measurement result reported by the UE can be deteriorated. Hence, when LAA DRS is designed, it is necessary to permit the existence of a DRS to be detected in a single DRS occasion. By doing so, it may be able to make the UE combine the existence of the DRS with RRM measurement, which is performed on successfully detected DRS occasions only.

Signals including a DRS do not guarantee DRS transmissions adjacent in time. In particular, if there is no data transmission in subframes accompanied with a DRS, there may exist OFDM symbols in which a physical signal is not transmitted. While operating in an unlicensed band, other nodes may sense that a corresponding channel is in an idle state during a silence period between DRS transmissions. In order to avoid the abovementioned problem, it is preferable that transmission bursts including a DRS signal are configured by adjacent OFDM symbols in which several signals are transmitted.

2.5 Channel Access Procedure and Contention Window Adjustment Procedure

In the following, the aforementioned channel access procedure and the contention window adjustment procedure are explained in the aspect of a transmission node.

Figure 11:
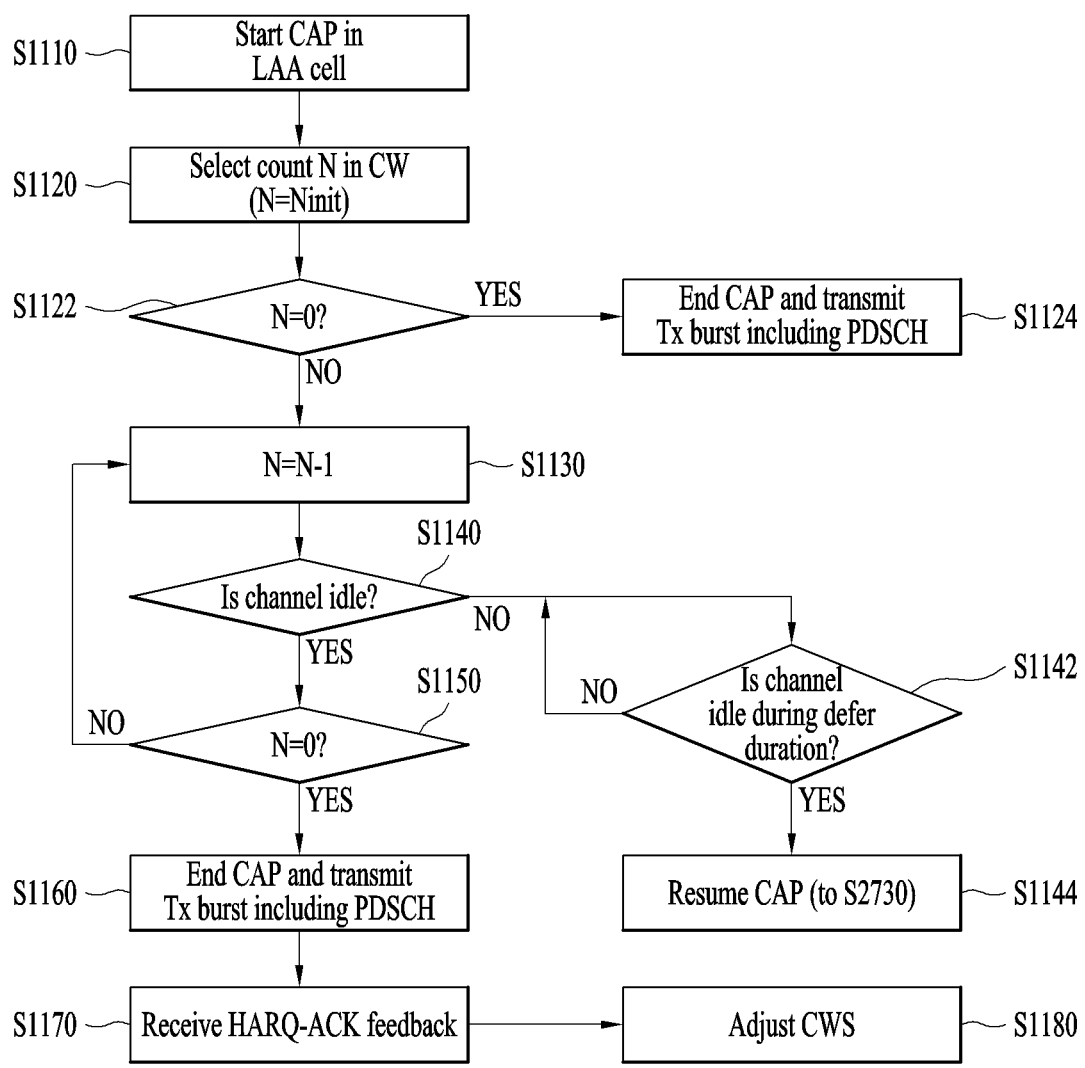
FIG. 11 is a flowchart for explaining CAP and CWA.

FIG. 11 is a flowchart for explaining CAP and CWA.

In order for an LTE transmission node (e.g., a base station) to operate in LAA Scell(s) corresponding to an unlicensed band cell for DL transmission, it may initiate a channel access procedure (CAP) [S1110].

The base station can randomly select a back-off counter N from a contention window (CW). In this case, the N is configured by an initial value Ninit [S1120]. The Ninit is randomly selected from among values ranging from 0 to $CW_p$.

Subsequently, if the back-off counter value (N) corresponds to 0 [S1122], the base station terminates the CAP and performs Tx burst transmission including PSCH [S1124].

On the contrary, if the back-off value is not 0, the base station reduces the back-off counter value by 1 [S1130].

The base station checks whether or not a channel of the LAA Scell(s) is in an idle state [S1140]. If the channel is in the idle state, the base station checks whether or not the back-off value corresponds to 0 [S1150]. The base station repeatedly checks whether or not the channel is in the idle state until the back-off value becomes 0 while reducing the back-off counter value by 1.

In the step S1140, if the channel is not in the idle state i.e., if the channel is in a busy state, the base station checks whether or not the channel is in the idle state during a defer duration (more than 15 usec) longer than a slot duration (e.g., 9 usec) [S1142]. If the channel is in the idle state during the defer duration, the base station can resume the CAP [S1144]. For example, when the back-off counter value Ninit corresponds to 10, if the channel state is determined as busy after the back-off counter value is reduced to 5, the base station senses the channel during the defer duration and determines whether or not the channel is in the idle state. In this case, if the channel is in the idle state during the defer duration, the base station performs the CAP again from the back-off counter value 5 (or, from the back-off counter value 4 by reducing the value by 1) rather than configures the back-off counter value Ninit. On the contrary, if the channel is in the busy state during the defer duration, the base station performs the step S1142 again to check whether or not the channel is in the idle state during a new defer duration.

Referring back to FIG. 11, the base station checks whether or not the back-off counter value (N) becomes 0 [S1150]. If the back-off counter value (N) becomes 0, the base station terminates the CAP and may be able to transmit a Tx burst including PDSCH.

The base station can receive HARQ-ACK information from a UE in response to the Tx burst [S1170]. The base station can adjust a CWS (contention window size) based on the HARQ-ACK information received from the UE [S1180].

In the step S1180, as a method of adjusting the CWS, the base station can adjust the CWS based on HARQ-ACK information on a first subframe of a most recently transmitted Tx burst (i.e., a start subframe of the Tx burst).

In this case, the base station can set an initial CW to each priority class before the CWP is performed. Subsequently, if a probability that HARQ-ACK values corresponding to PDSCH transmitted in a reference subframe are determined as NACK is equal to or greater than 80%, the base station increases CW values set to each priority class to a next higher priority.

In the step S1160, PDSCH can be assigned by a self-carrier scheduling scheme or a cross-carrier scheduling scheme. If the PDSCH is assigned by the self-carrier scheduling scheme, the base station counts DTX, NACK/DTX, or ANY state among the HARQ-ACK information fed back by the UE as NACK. If the PDSCH is assigned by the cross-carrier scheduling scheme, the base station counts the NACK/DTX and the ANY states as NACK and does not count the DTX state as NACK among the HARQ-ACK information fed back by the UE.

If bundling is performed over M (M>=2) number of subframes and bundled HARQ-ACK information is received, the base station may consider the bundled HARQ-ACK information as M number of HARQ-ACK responses. In this case, it is preferable that a reference subframe is included in the M number of bundled subframes.

3. Proposed Embodiment

When a base station or a UE performs LBT (listen-before-talk)-based signal transmission in a wireless communication system consisting of the base station and the UE, the present invention proposes a method for a specific node (a base station or a UE) to transmit a signal while occupying a system bandwidth more than a prescribed ratio (e.g., X %) to transmit the signal via an unlicensed band.

As mentioned in the foregoing description, a base station or a UE monitors whether or not a different communication node transmits a signal via an LBT operation. The operation can be referred to as CS (carrier sensing) or CCA (clear channel assessment). In this case, if it is determined as there is no signal transmission of a different communication node based on a result of the CCA, it is defined as a channel non-occupied state (or channel idle state). If there is a signal transmission, it is defined as a channel occupied state (or channel busy state).

According to the present invention, a base station or a UE should perform LBT to transmit a signal on an unlicensed band. When the base station or the UE transmits a signal, it is necessary to make signal interference not to be occurred with different communication nodes such as Wi-Fi, and the like. For example, according to Wi-Fi standard, a CCA threshold value is regulated by −62 dBm and −82 dBm for a non-Wi-Fi signal and a Wi-Fi signal, respectively. In particular, if an STA (station) or an AP (access point) senses a signal received with power (or energy) equal to or greater than −62 dBm rather than Wi-Fi, the STA or the AP does not perform signal transmission.

In this case, When a certain node transmits a signal via an unlicensed band, a regulation for the unlicensed band may have a constraint such that a system bandwidth should be occupied as much as a ratio equal to or greater than a prescribed ratio (e.g., X %). For example, EU regulation regulates that more than 80% of a nominal bandwidth should be occupied. Hence, the present invention proposes a hopping method capable of satisfying the above regulation. In the following description, although a hopping pattern for transmitting PUSCH is mainly explained, the same hopping rule can be applied to an uplink channel, a downlink channel, a signal (e.g., PUCCH, SRS, etc.), and the like.

3.1 Interlaced PUSCH Structure

Figure 12:
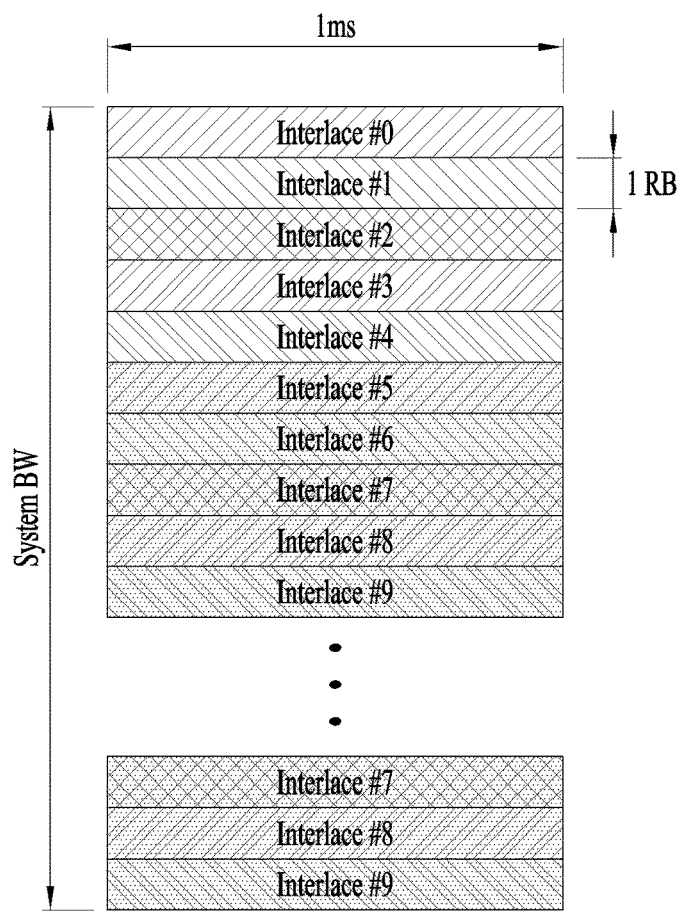
FIG. 12 is a diagram illustrating an interlaced PUSCH structure according to the present invention.

FIG. 12 is a diagram illustrating an interlaced PUSCH structure according to the present invention.

It is able to configure an uplink transmission band to be spanned over the entire system band by utilizing an interlaced structure shown in FIG. 12. In FIG. 12, although it is depicted as each interlace corresponds to 1 RB (resource block), the interlace can also be configured in a unit of the predetermined number of REs (e.g., 1 RE) in a different example. And, an interval between interlaces can be configured by one or more RBs or one or more REs depending on a configuration. And, the number of interlaces can also be configured by a different value rather than 10.

However, the interlaced PUSCH may have a demerit in terms of PAPR (peak-to-average power ratio) and resource allocation flexibility. More specifically, when each of interlaces is configured in a unit of a subcarrier and is configured by the same interval, it is able to maintain single carrier property. On the contrary, if the interlaces are differently configured, since it is unable to maintain the single carrier property, performance can be degraded to a level lower than a performance level of uplink transmission of a legacy LTE system in terms of PAPR. And, when PUSCH is assigned to a UE in a manner shown in FIG. 12, since it is necessary to allocate at least one or more interlaces to the UE, resource allocation flexibility can be lowered.

3.2 PUSCH+Wideband SRS

Figure 13:
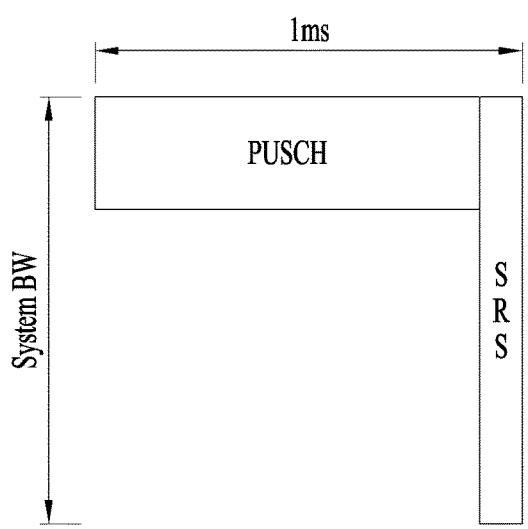
FIG. 13 is a diagram illustrating a PUSCH and a wideband SRS structure according to the present invention.

FIG. 13 is a diagram illustrating a PUSCH and a wideband SRS structure according to the present invention.

As shown in FIG. 13, although a PUSCH is transmitted on a partial band only, if a wideband SRS is transmitted in the last symbol, a UE can satisfy an occupied bandwidth condition equal to or greater than 80% within 1 ms. Yet, since the last SC-FDM symbol is used for transmitting the SRS, spectral efficiency can be reduced.

3.3 Inter Slot Hopping

In a legacy LTE system, when a UE transmits uplink data (e.g., PUSCH or PUCCH), a method of hopping the uplink data in a slot unit in a subframe has been defined.

Figure 14:
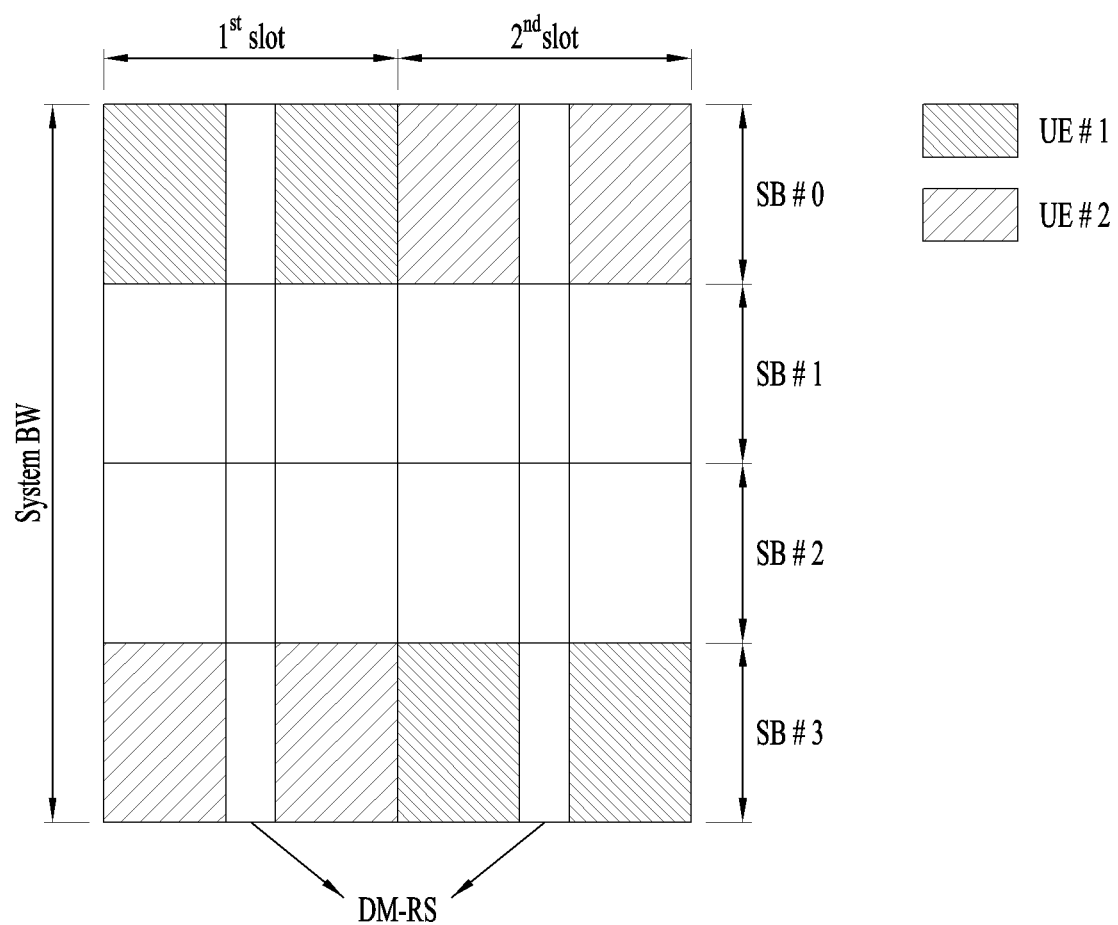
FIG. 14 is a diagram illustrating a method of performing inter-slot hopping according to the present invention.

FIG. 14 is a diagram illustrating a method of performing inter-slot hopping according to the present invention.

In FIG. 14, assume a case that the total system bandwidth is divided into 4 subbands and each of the 4 subbands is to be allocated to each of UEs. In this case, as shown in FIG. 14, $0^{th}$ SB (SB #0) is allocated to a first UE (UE #1) and $3^{rd}$ SB (SB #3) is allocated to a second UE (UE #2) in a first slot. Subsequently, slot hopping is indicated in a second slot. In particular, $3^{rd}$ SB (SB #3) is allocated to the first UE and $0^{th}$ SB (SB #0) can be allocated to the second UE in the second slot. In particular, if the first UE and the second UE are configured to transmit uplink data, the first UE and the second UE can transmit data by spanning a band into the total system bandwidth within 1 ms. In this case, it may have a demerit in that it is unable to allocate $1^{st}$ SB (SB #1) and the $2^{nd}$ SB (SB #2) to a different UE.

In order to solve the problem above, the present invention proposes a method that makes a plurality of UEs span a system bandwidth or a nominal BW more than a prescribed ratio (e.g., X %) within prescribed time (e.g., Y ms) while more resources are utilized via intra-slot hopping compared to inter-slot hopping.

3.4 Intra-Slot Hopping

3.4.1 First Example

Figure 15:
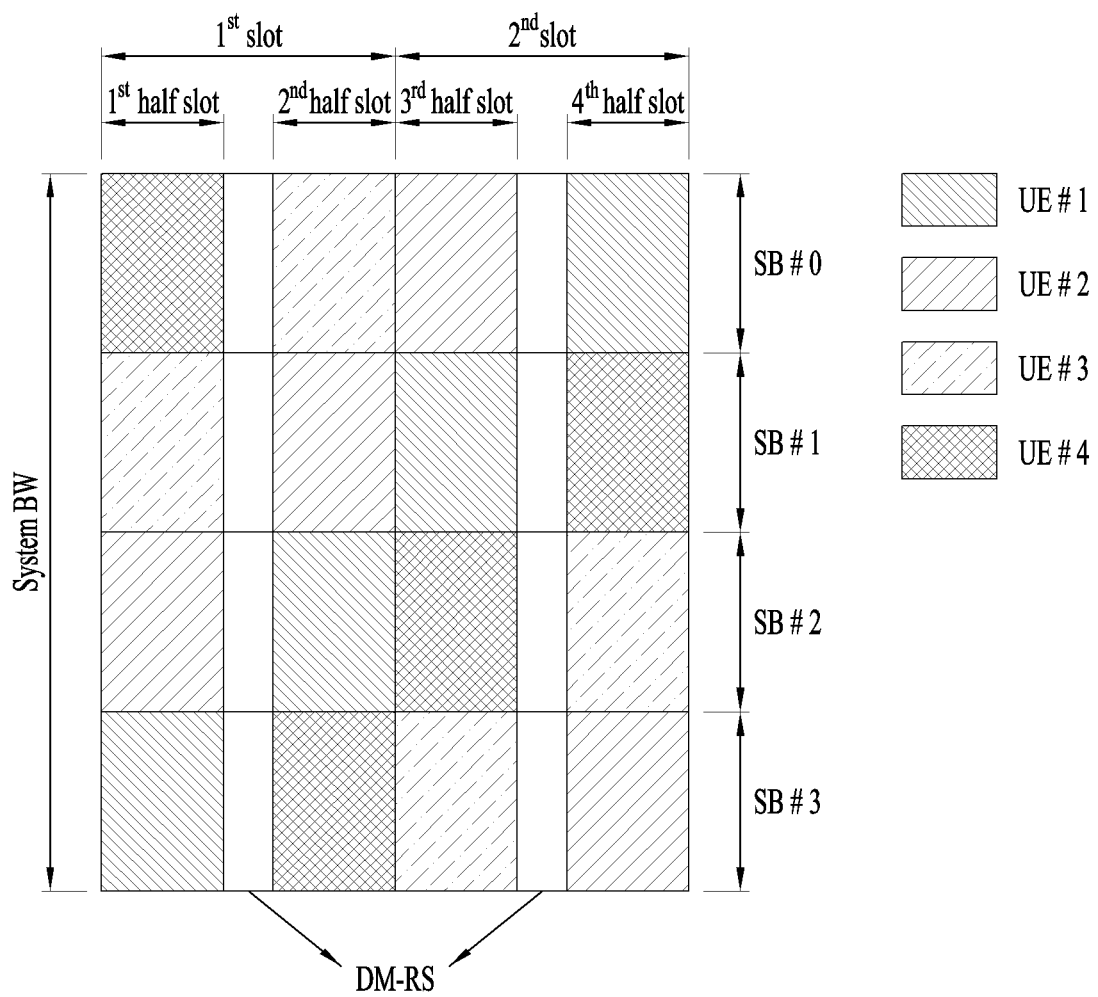
FIG. 15 is a diagram illustrating a method of performing intra-slot hopping according to a first example of the present invention.

FIG. 15 is a diagram illustrating a method of performing intra-slot hopping according to a first example of the present invention.

As shown in FIG. 15, when the total system bandwidth is divided into 4 subbands, it is able to allocate an SB to 4 UEs by applying an intra-slot hopping method.

More specifically, referring to FIG. 15, $0^{th}$ SB (SB #0) is allocated to a fourth UE (UE #4), $1^{st}$ SB (SB #1) is allocated to a third UE (UE #3), $2^{nd}$ SB (SB #2) is allocated to a second UE (UE #2), and $3^{rd}$ SB (SB #3) is allocated to a first UE (UE #1) in the $1^{st}$ half slot. Subsequently, it is able to determine an SB to be allocated to each UE in the $2^{nd}$ half slot via a rule of ({SB number allocated to the first half slot}−1) mod 4. By doing so, it is able to determine an SB to be allocated to each UE in the $3^{rd}$ half slot and the $4^{th}$ half slot. In other word, it is able to determine an SB to be used for a UE to transmit a signal.

The intra-slot hopping pattern shown in FIG. 15 illustrates a case that hopping in a next half-slot is performed by setting an SB index offset to −1 when 4 subbands are configured in frequency domain and hopping in a half-slot unit is applied in time domain.

When FIG. 14 is compared with FIG. 15, according to the first example of the present invention, it may have a merit in that all UEs are able to span the total system bandwidth within 1 ms despite of the SB allocated to 4 UEs while all SBs are utilized.

3.4.2 Second Example

Figure 16:
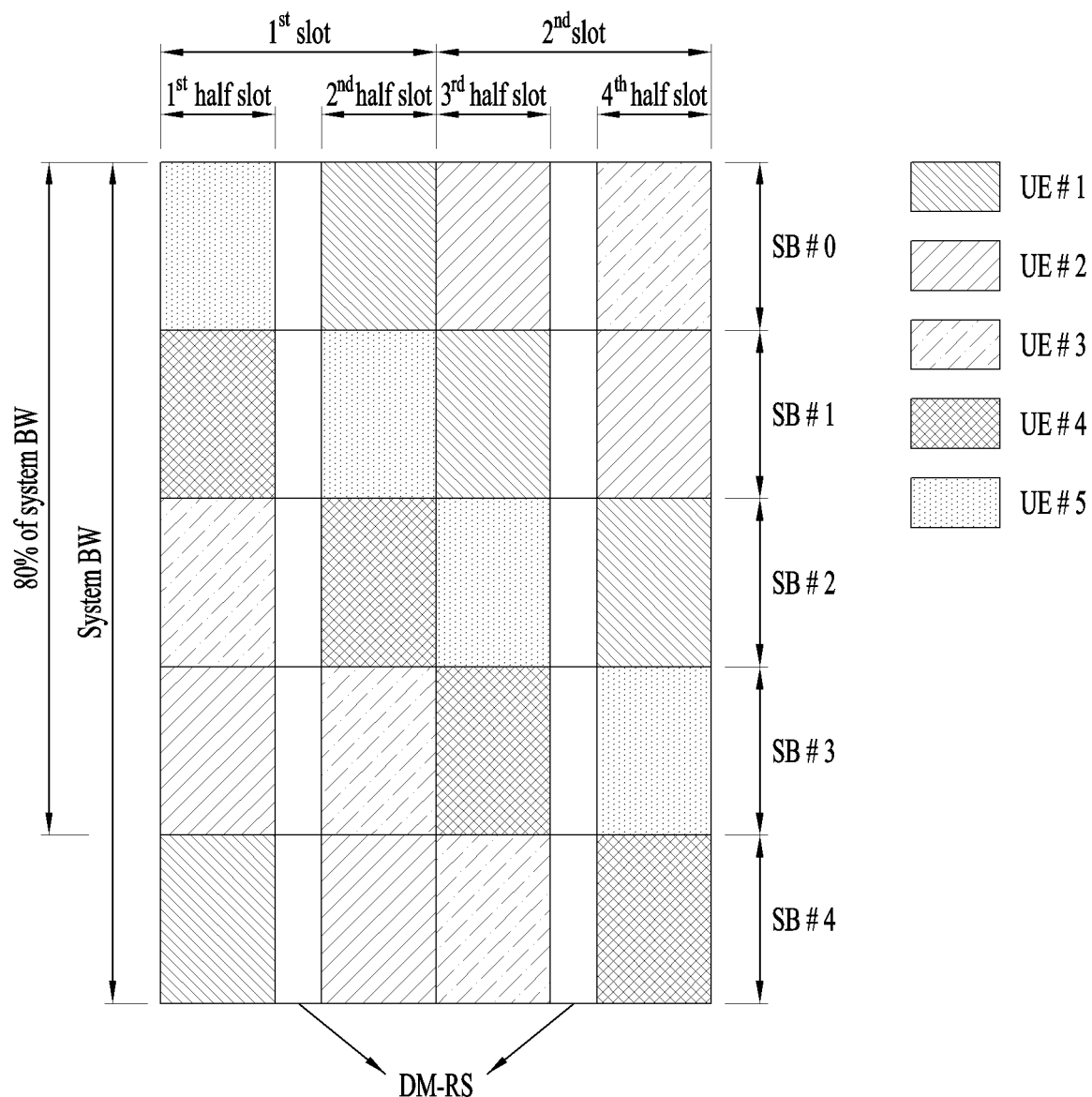
FIG. 16 is a diagram illustrating a method of performing intra-slot hopping according to a second example of the present invention.

FIG. 16 is a diagram illustrating a method of performing intra-slot hopping according to a second example of the present invention.

FIG. 16 illustrates a case that hopping in a next half-slot is performed by setting an SB index offset to +1 when 5 subbands are configured in frequency domain and hopping in a half-slot unit is applied in time domain.

Referring to FIG. 16, $0^{th}$ SB (SB #0) is allocated to a fifth UE (UE #5), $1^{st}$ SB (SB #1) is allocated to a fourth UE (UE #4), $2^{nd}$ SB (SB #2) is allocated to a third UE (UE #3), $3^{rd}$ SB (SB #3) is allocated to a second UE (UE #2), and $4^{th}$ SB (SB #4) is allocated to a first UE (UE #1) in the $1^{st}$ half slot. Subsequently, it is able to determine an SB to be allocated to each UE in the $2^{nd}$ half slot, the $3^{rd}$ half slot, and the $4^{th}$ half slot via a rule of ({SB number allocated to the first half slot}+1) mod 5. By doing so, it may have a merit in that it is able to utilize all resources while all 5 UEs are able to span at least 80% of the total system bandwidth within 1 ms.

The intra-slot hopping method according to the first example and the second example can be generalized as follows. When the number of total subbands corresponds to N (e.g., N=2, 3, 4, 5, . . . ), a subband hopping offset value according to a hopping unit corresponds to K (e.g., K= . . . −2, −1, 0, 1, 2, . . . ), and a subband number at a $t^{th}$ hopping unit corresponds to f(t), it may be able to define f(t+1)=(f(t)+K) mod N corresponding to a subband number at a next hopping unit. In particular, the example shown in FIG. 15 corresponds to a case that N corresponds to 4, K corresponds to −1, and a hopping unit corresponds to a half slot. The example shown in FIG. 16 corresponds to a case that N corresponds to 5, K corresponds to +1, and a hopping unit corresponds to a half slot. In the examples of FIGS. 15 and 16, if a hopping unit corresponds to a slot, the entire system bandwidth or 80% of the system bandwidth can be spanned during 2 ms.

If the number (R) of resource units (e.g., RB) constructing the entire system bandwidth is not an integer multiple of the number (N) of subbands, it may be able to configure hopping to be performed while a partial resource unit is excluded. For example, when 50 RBs are configured by 4 subbands, each of the subbands is configured by 12 RBs and hopping can be performed while the remaining 2 RBs are excluded. In this case, the remaining 2 RBs can be positioned at one end of the entire system bandwidth, can be positioned at both ends by dividing the remaining 2 RBs, or can be positioned at the center of the system bandwidth.

All or a part of the aforementioned parameters (N, K, and a hopping unit (e.g., 1/M slot, a slot, a subframe, etc.) may correspond to a predetermined value, a value configured via higher layer signaling, or a value configured via physical layer signaling. All or a part of the N, the K, and the hopping unit can also be configured via capability signaling according to a UE.

3.4.3 Third Example

According to the aforementioned first and second examples, it may have a demerit in that it is difficult to maintain single carrier property in a symbol in which a DMRS (demodulation reference signal) is transmitted. For example, in case of a UE #4 in FIG. 15, since the UE #4 is allocated to SB #0 and SB #3 in a first slot, it is difficult to guarantee the single carrier property in a symbol in which a DMRS is transmitted. In order to supplement the demerit, a method of transmitting a signal using contiguously allocated resources in a slot is proposed.

Figure 17:
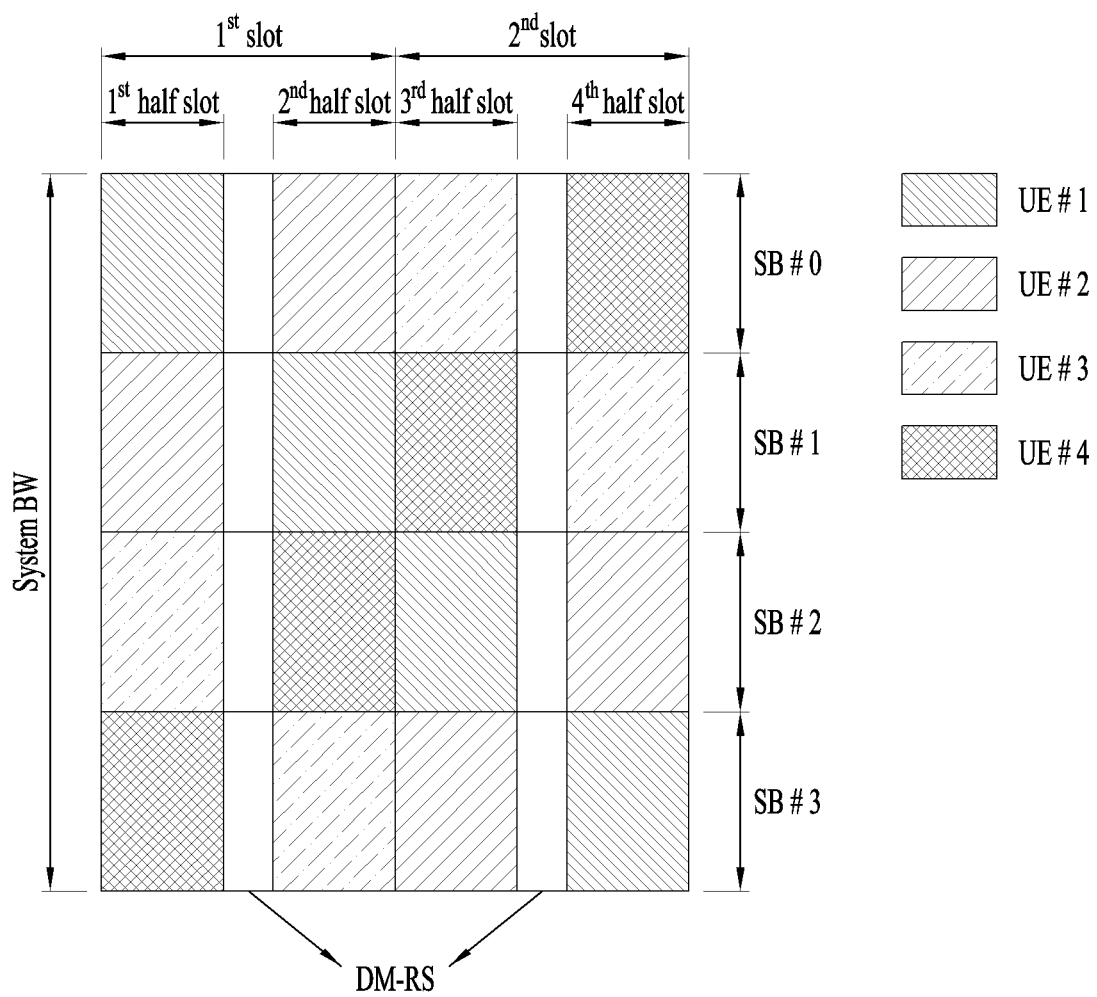
FIG. 17 is a diagram illustrating a method of performing intra-slot hopping according to a third example of the present invention.

FIG. 17 is a diagram illustrating a method of performing intra-slot hopping according to a third example of the present invention.

Similar to FIG. 15, FIG. 17 illustrates a case that 4 subbands are allocated to 4 UEs while a hopping method is differently configured only. According to the hopping method illustrated in FIG. 17, it may have a merit in that all UEs are able to continuously transmit a DMRS sequence in a slot without terminating the sequence in the middle (on a frequency axis).

It may be able to extensively apply the hopping pattern mentioned earlier in FIG. 17 to a case of differently configuring the number of subbands. In particular, if the hopping pattern is generalized to have scalability, the hopping pattern can be described as follows.

Figure 18:
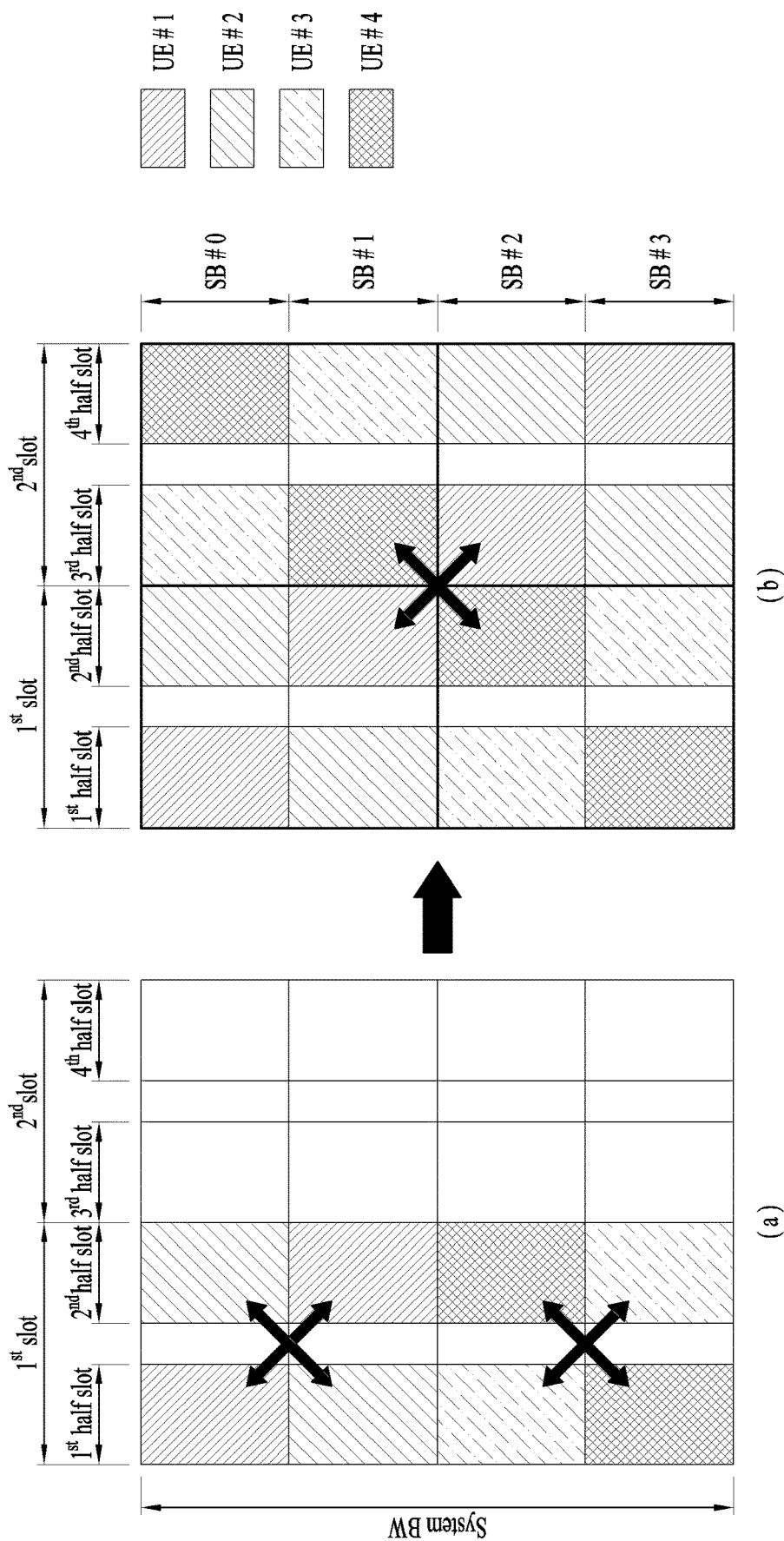
FIG. 18 is a schematic diagram for a rule applicable to a hopping method illustrated in FIG. 17

FIG. 18 is a schematic diagram for a rule applicable to a hopping method illustrated in FIG. 17.

As shown in FIG. 18, cross allocation or swapping is performed on two adjacent subbands in a first hopping unit and a second hopping unit. In a next hopping, a subblock is configured by extending subbands as much as twice on a time axis and a frequency axis and cross allocation or swapping is performed on an allocated resource position by adjacent sub blocks.

3.4.4 Fourth Example

If a hopping pattern shown in FIG. 18 is extensively applied, it is able to apply the hopping pattern even when resources are equally divided by $2^n$ on a time axis and a frequency axis.

Figure 19:
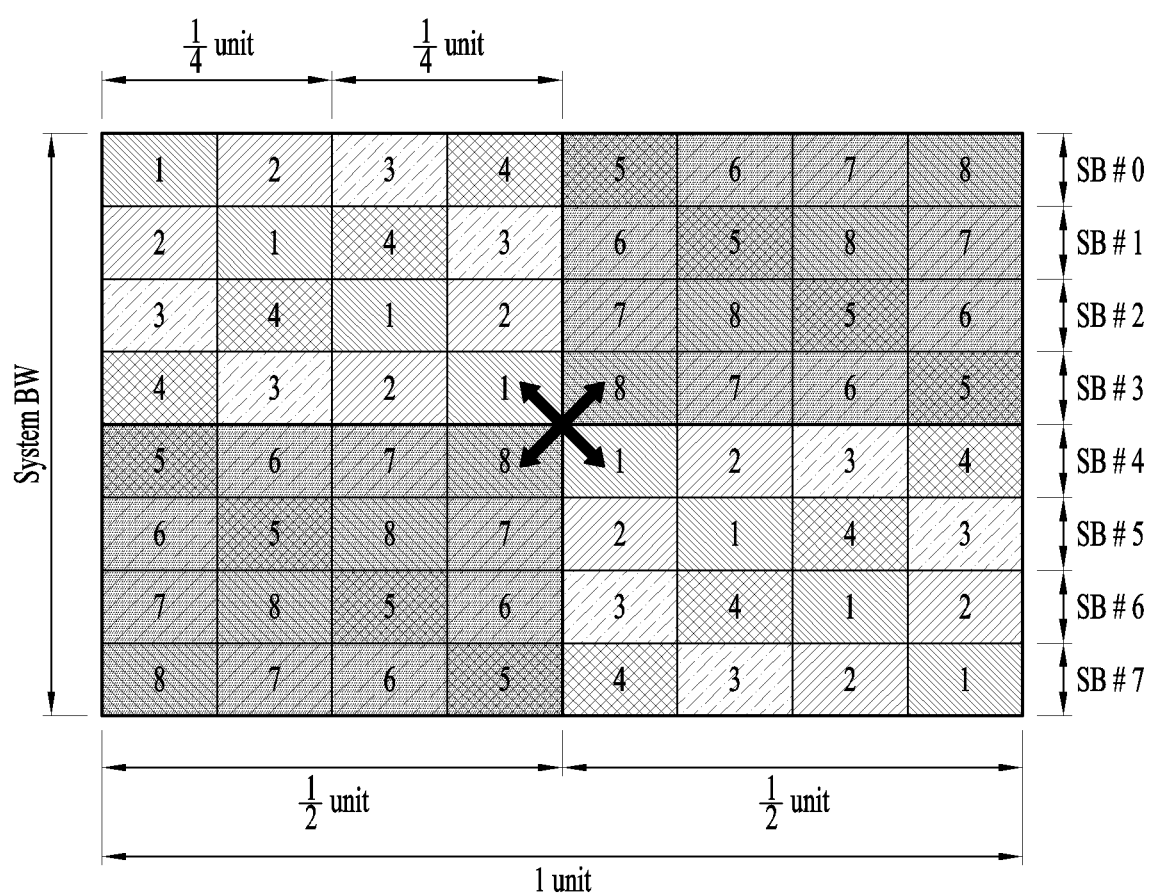
FIG. 19 is a diagram illustrating a method of performing intra-slot hopping according to a fourth example of the present invention.

FIG. 19 is a diagram illustrating a method of performing intra-slot hopping according to a fourth example of the present invention.

FIG. 19 illustrates a case that resources are divided by 8 on a time axis and a frequency axis. In this case, it may have a merit in that it is able to span the total system bandwidth during one unit time (on the time axis) while resources are allocated to all UEs at the same time. In this case, the one unit time may correspond to one subframe or two subframes. If the one unit time corresponds to one subframe, ½ unit time and ¼ unit time may correspond to one slot and a half slot, respectively.

The aforementioned hopping method according to the third example and the fourth example can determine an SB index to be allocated to each hopping unit based on information described in the following.

A predetermined hopping pattern

A preconfigured hopping unit (or a hopping unit configured via higher layer signaling or physical layer signaling) (e.g., 1/M slot, slot, subframe, etc.)

An SB index, which is configured via higher layer signaling or physical layer signaling, allocated to a first hopping unit Or, it may be able to determine a hopping pattern based on the aforementioned parameters including the N, the K, the hopping units, and the like by signaling the parameters to the hopping method according to the third example and the fourth example without a predetermined hopping pattern. A signaling method of the parameters is described in the following in detail.

(1) If an SB index allocated to a first hopping unit is indicated by DCI in a state that a hopping offset value K is configured via RRC (radio resource control) according to a subband, it is able to determine following subband indexes by the aforementioned hopping rule. For example, if a hopping offset value K for each of {SB #0, SB #1, SB #2, SB #3} is set to {+1, −1, +1, −1}, it is able to satisfy the hopping pattern proposed in FIG. 17. As a different example, if a hopping offset value K for each of {SB #0, SB #1, SB #2, SB #3} is set to {−1, −1, −1, −1}, it is able to satisfy the hopping pattern proposed in FIG. 15.

(2) If both an SB index allocated to a first hopping unit and a subband hopping offset value K are indicated by DCI, a UE can determine following subband indexes based on the information. For example, in case of the first example and the second example, the same hopping offset K value is indicated to all UEs. On the contrary, in case of the third example and the fourth example, it may be able to configure a different hopping offset K value to be indicated according to a UE and an SB index.

3.5 Hopping Method when System Bandwidth is Differently Configured Between eNB and UE The aforementioned hopping methods mentioned earlier in the paragraph 3.4 can be applied even when a system bandwidth is differently configured between a downlink and an uplink.

Figure 20:
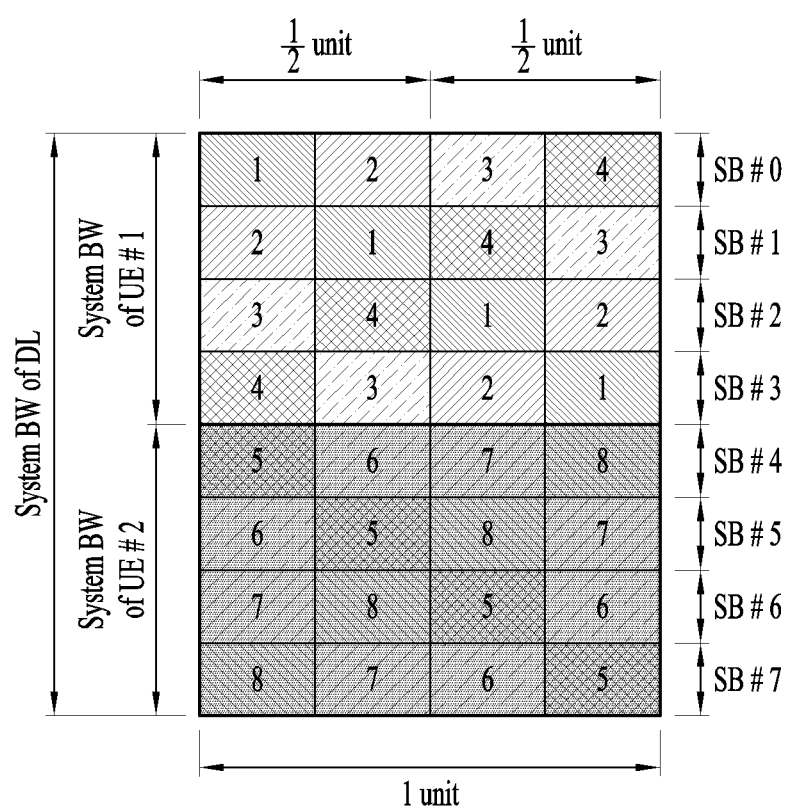
FIG. 20 is a diagram illustrating a hopping method when a system bandwidth is differently configured between a base station and a UE.

FIG. 20 is a diagram illustrating a hopping method when a system bandwidth is differently configured between an eNB and a UE.

FIG. 20 illustrates a hopping method when a downlink system bandwidth corresponds to 20 MHz and a system bandwidth set to a UE #1 and a UE #2 corresponds to 10 MHz. In this case, a UE can be configured to span the entire system bandwidth by applying the aforementioned hopping methods in a system bandwidth set to the UE only. In this case, the system bandwidth can be set to each of the UEs via higher layer signaling or physical layer signaling. Or, it is able to configure a system bandwidth on which hopping is to be performed by an SB index allocated to a first hopping unit. For example, referring to FIG. 20, when a UE is allocated to an SB #1, the UE can be configured to perform hopping on SB #0 to SB #3 only.

3.6 Method of Allocating Uplink Data Resource

As mentioned in the foregoing description, when an uplink data resource is allocated according to a subband, a base station can inform a UE of a scheduled SB index using bitmap information. For example, when '1100' is indicated as bitmap information in a system consisting of 4 subbands, if a UE receives the bitmap information, the UE is able to recognize that uplink data is scheduled to SB #0 and SB #1 in a first hopping unit.

As a different example, the base station can indicate or inform the UE of a combination of (a starting SB index, the number of scheduled SBs). For example, when a combination of (a starting SB index # Z, the W number of scheduled SBs) is indicated, if the UE receives the indication, the UE is able to recognize that uplink data is scheduled to the W number of subbands ranging from SB # Z to SB #(Z+W−1) in a first hopping unit.

3.7 Hopping Method for Allocating RB of Various Sizes

In the foregoing description, the hopping methods capable of spanning a system bandwidth only when a resource of a size identical to a size of a subband is allocated have been proposed. However, in an actual LTE system, resources as much as needed are flexibly allocated according to a UE to efficiently utilize a radio resource. Hence, in the present paragraph, a hopping method capable of being extensively applied to a case that a resource of a size greater or less than a size of a subband is allocated and a hopping method capable of spanning a system bandwidth are proposed using the aforementioned hopping methods.

3.7.1 Fifth Example

In case of LTE system operating on 20 MHz band, in general, a band about 2 MHz is configured as a guard band and a band as much as the remaining 18 MHz is divided into 100 resource blocks to perform resource allocation in an RB unit. Similar to EU regulation, if there is an occupied bandwidth-related requirement such that transmission is performed by occupying 80% of the entire system bandwidth, it is necessary to transmit data by occupying at least 16 MHz corresponding to 80% of 20 MHz. If the 16 MHz is converted into an RB unit, it becomes about 90 RBs.

Figure 21:
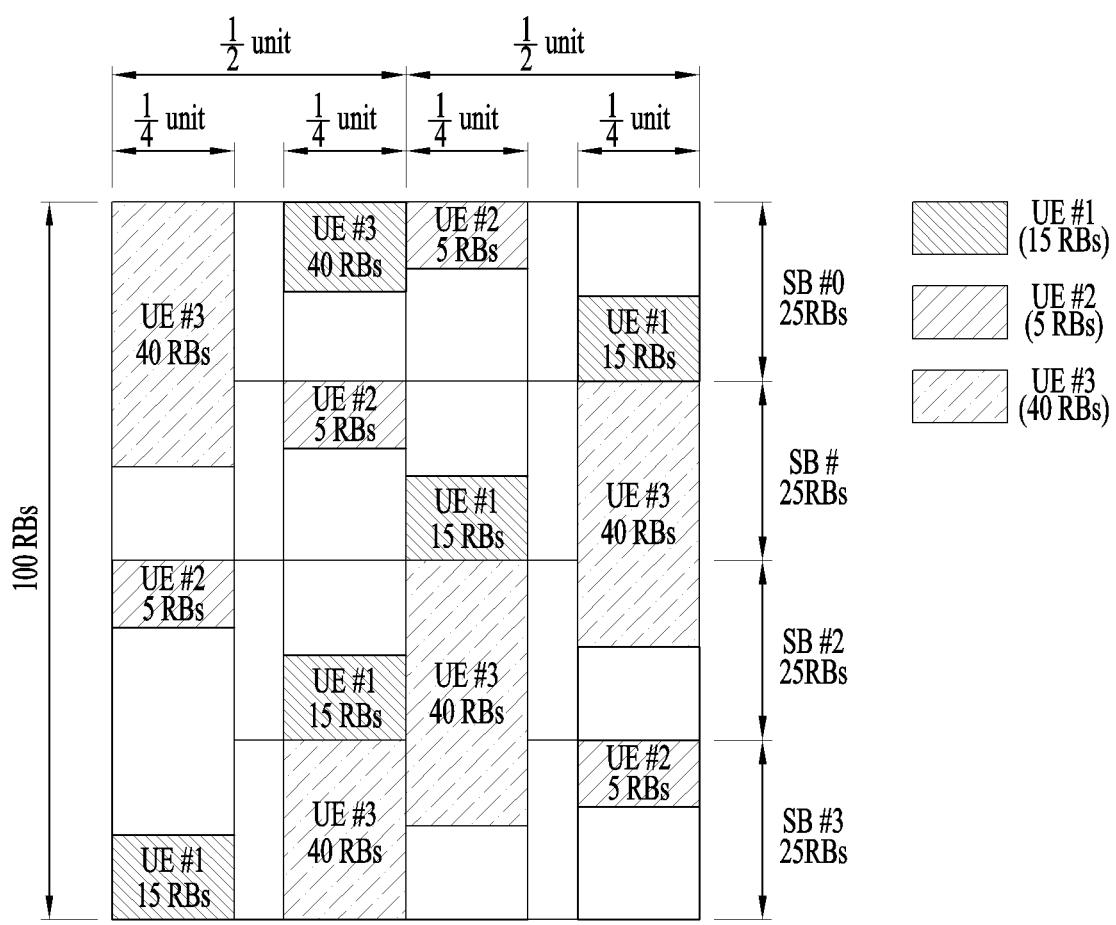
FIG. 21 is a diagram illustrating a method of performing intra-slot hopping according to a fifth example of the present invention.

FIG. 21 is a diagram illustrating a method of performing intra-slot hopping according to a fifth example of the present invention.

FIG. 21 illustrates a case that 15 RBs are allocated to a UE #1, 5 RBs are allocated to a UE #2, and 40 RBs are allocated to a UE #3 when 4 subbands (N=4) are configured in a system of 100 RBs (when a system bandwidth corresponds to 20 MHz). In this case, as mentioned earlier in FIG. 15, a hopping method is applied in a manner that a subband hopping offset K is set to −1. In particular, hopping is performed in a predetermined subband unit irrespective of the number of practically allocated RBs.

In particular, since the UE #1 to which 15 RBs are allocated transmits data by spanning 90 RBs among the total 100 RBs, it may consider that the UE #1 satisfies the occupied bandwidth-related requirement. On the contrary, since the UE #2 to which 5 RBs are allocated only transmits data by spanning 80 RBs only among the total 100 RBs, it may consider that the UE #2 fails to satisfy the occupied bandwidth-related requirement. And, although the UE #3 transmits data by spanning the total 100 RBs, since the UE #3 transmits the data by dividing the RBs into two clusters in a second hopping unit, a problem may occur on PAPR or (multi-cluster transmission-related) UE capability.

Figure 22:
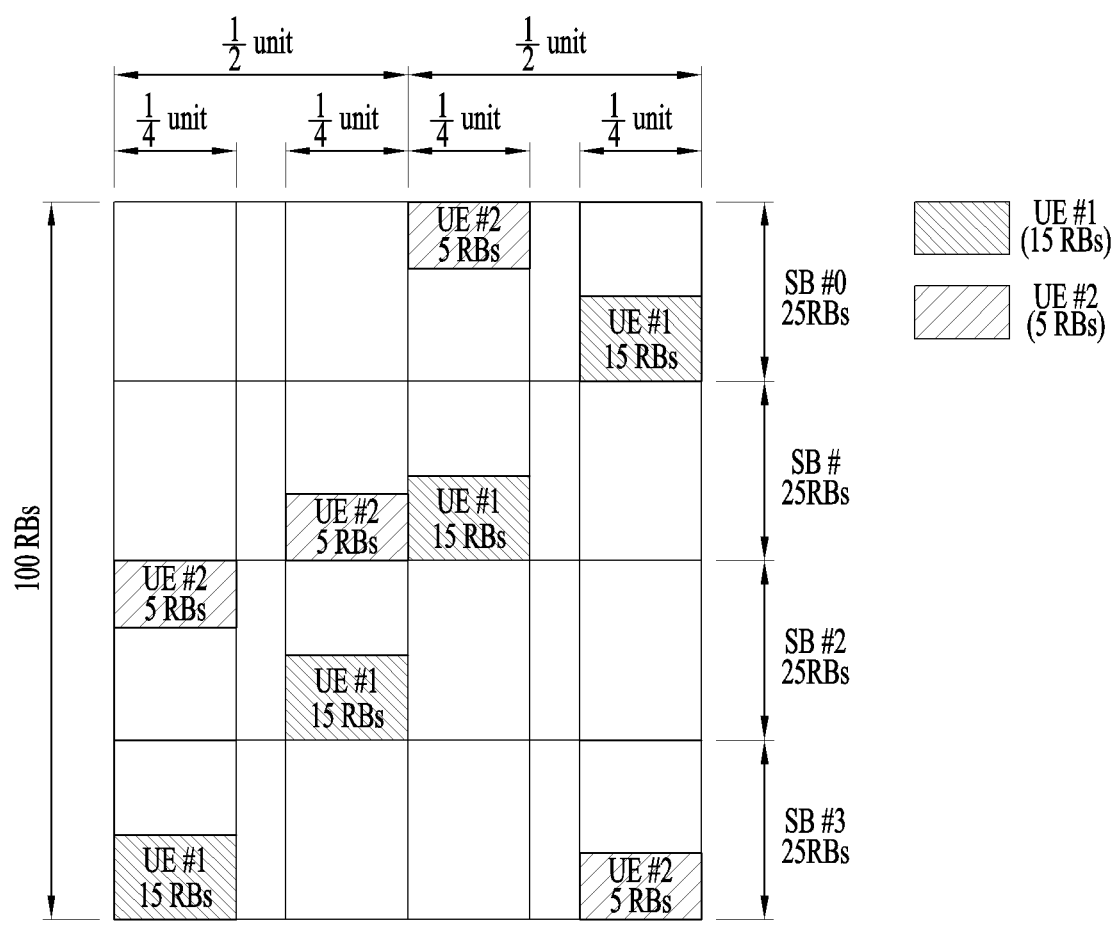
FIG. 22 is a diagram illustrating a hopping method for mirroring an RB index allocated to a second UE shown in FIG. 21.

In FIG. 21, in order to make the UE #2 to which 5 RBs are allocated only satisfy the occupied bandwidth-related requirement, it may be able to configure the UE #2 to perform mirroring on an RB index in a subband. FIG. 22 is a diagram illustrating a hopping method that mirroring is performed on an RB index allocated to the UE #2 shown in FIG. 21.

As shown in FIG. 22, it is able to check that the UE #2 performs transmission by spanning the entire 100 RBs in a manner of performing mirroring on an RB index in a second hopping unit and a fourth hopping unit. Whether to perform mirroring can be configured via higher layer signaling or physical layer signaling. Whether to perform mirroring can be differently configured according to a UE or an SB index.

On the contrary, in case of the UE #3, RBs are allocated over two or more subbands. In particular, data are separated or divided into a plurality of clusters on a frequency axis. In this case, it is not easy to solve the phenomenon above via the aforementioned fifth example. Hence, when RBs are allocated over two or more subbands, a solution for the phenomenon is proposed in the following.

3.7.2 Sixth Example

Figure 23:
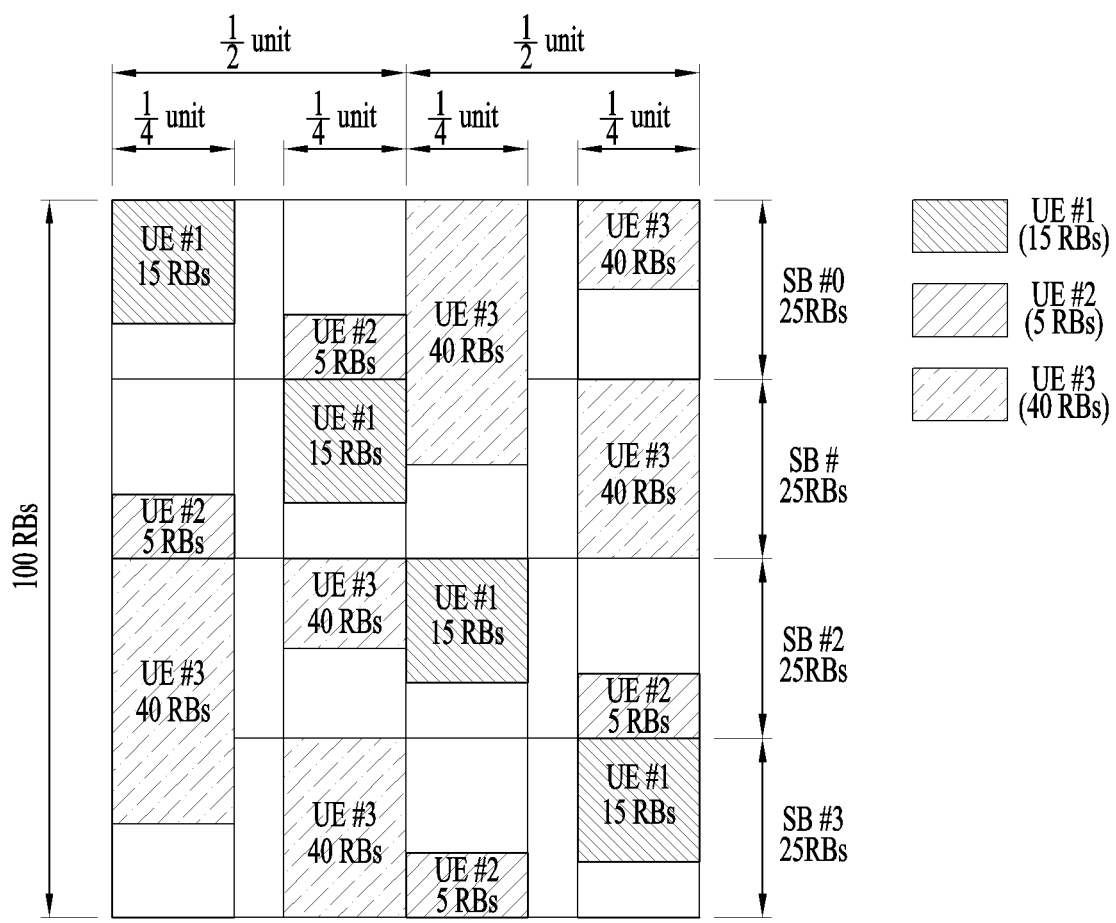
FIG. 23 is a diagram illustrating a method of performing intra-slot hopping according to a sixth example of the present invention.

FIG. 23 is a diagram illustrating a hopping method according to a sixth example of the present invention.

Similar to FIGS. 21 and 22, FIG. 23 illustrates a system that a system bandwidth corresponds to 20 MHz. In particular, FIG. 23 illustrates a case that 15 RBs are allocated to a UE #1, 5 RBs are allocated to a UE #2, and 40 RBs are allocated to a UE #3 when 4 subbands (N=4) are configured in a system of 100 RBs (when a system bandwidth corresponds to 20 MHz). In this case, a hopping method identical to the hopping method mentioned earlier in FIG. 17 is applied. In particular, hopping is performed in a predetermined subband unit irrespective of the number of practically allocated RBs.

In particular, since the UE #1 to which 15 RBs are allocated transmits data by spanning 90 RBs among the total 100 RBs, it may consider that the UE #1 satisfies the occupied bandwidth-related requirement. On the contrary, since the UE #2 to which 5 RBs are allocated only transmits data by spanning 80 RBs only among the total 100 RBs, it may consider that the UE #2 fails to satisfy the occupied bandwidth-related requirement. And, although the UE #3 transmits data by spanning the total 100 RBs, since the UE #3 transmits the data by dividing the RBs into two clusters in second and fourth hopping units, a problem may occur on PAPR or UE capability.

Figure 24:
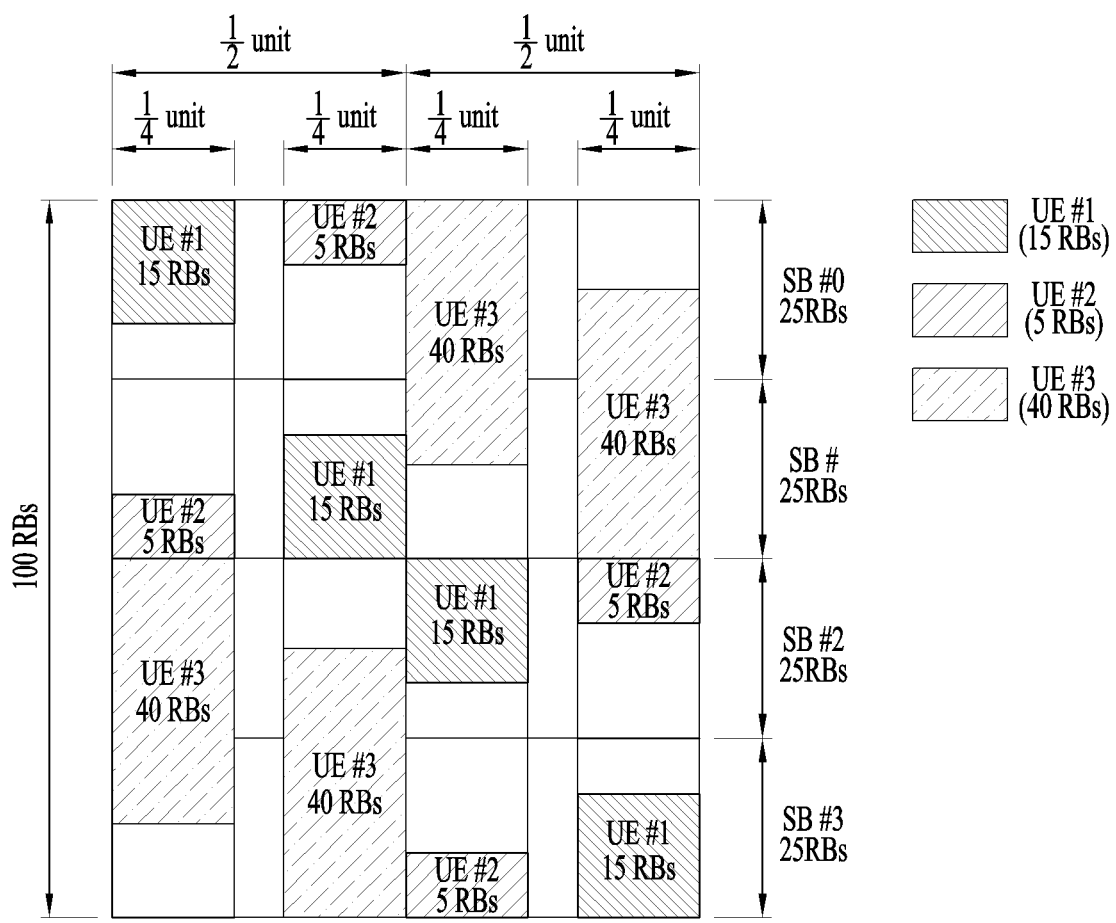
FIG. 24 is a diagram illustrating a hopping method for mirroring an RB index allocated to a second UE and a third UE shown in FIG. 23.

In FIG. 23, in order to make the UE #2 satisfy the occupied bandwidth-related requirement and make the UE #3 not to separate or divide data into a plurality of clusters, it may be able to configure the UE #2 and the UE #3 to perform mirroring on an RB index in a subband. FIG. 24 is a diagram illustrating a hopping method that mirroring is performed on an RB index allocated to the UE #2 and the UE #3 shown in FIG. 23.

As shown in FIG. 24, it is able to check that the UE #2 performs transmission by spanning the entire 100 RBs in a manner of performing mirroring on an RB index in a second hopping unit and a fourth hopping unit. And, it is able to check that the UE #3 transmits data to a single cluster in all hopping units. Whether to perform mirroring can be configured via higher layer signaling or physical layer signaling. Whether to perform mirroring can be differently configured according to a UE or an SB index.

3.7.3 When a Size of Allocated RBs is Equal to or Greater than a Size of the Half of the Entire RBs of a System Bandwidth In case of the hopping methods according to the aforementioned fifth example and the sixth example, if a size of allocated RBs is equal to or greater than 50 RBs, although hopping is performed in a slot unit without performing hopping within a slot, it is able to transmit data by spanning the entire system bandwidth within 1 ms. When s DMRS issue, which occurs due to the hopping in a slot, is considered, it is preferable to reduce a hopping count. Hence, a UE can differently apply a hopping method according to a size of allocated RBs. Specifically, if a size of allocated RBs is equal to or greater than a size of the half of the entire RBs of a system bandwidth, it may apply a method of permitting slot hopping only.

Figure 25:
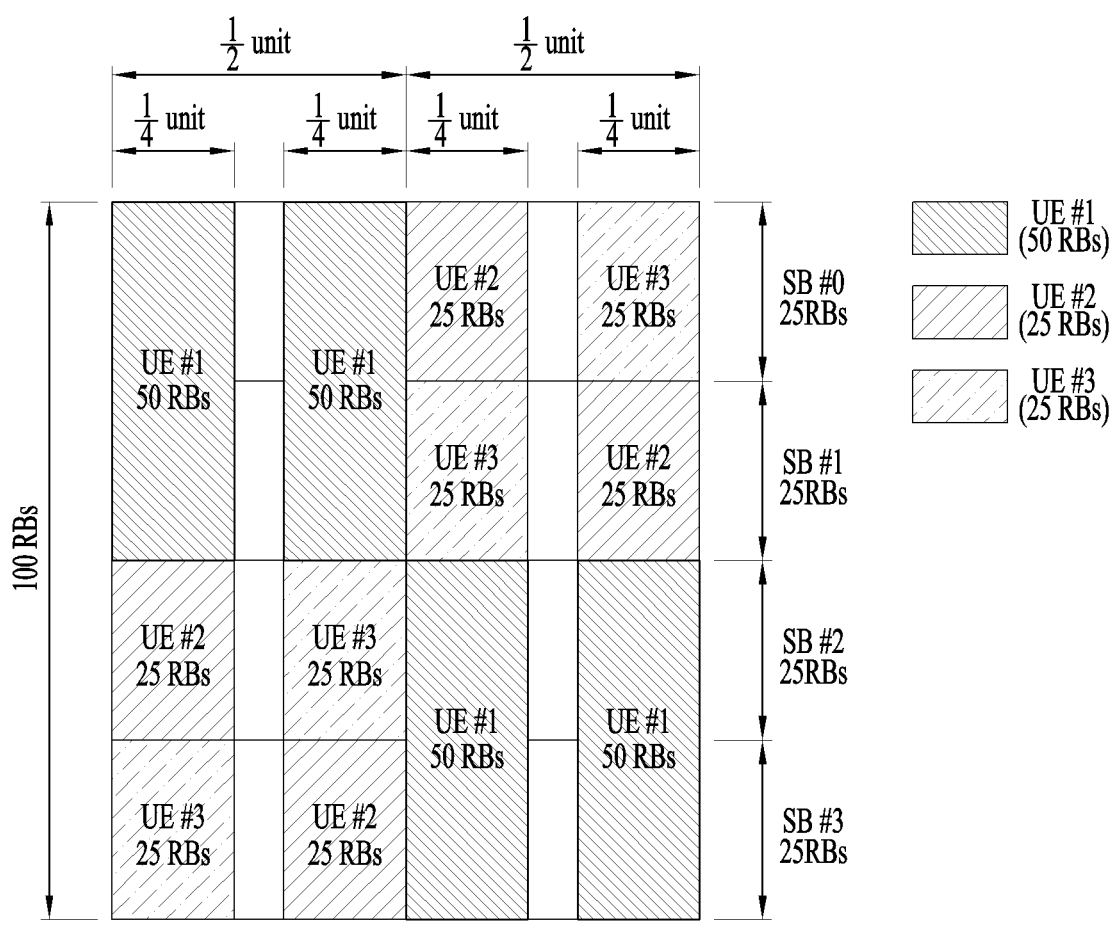
FIG. 25 is a diagram illustrating a hopping method applied to a first UE, a second UE, and a third UE according to the present invention when more than half of the entire RBs of a system bandwidth are allocated to the first UE.

FIG. 25 is a diagram illustrating a hopping method applied to a first UE, a second UE, and a third UE according to the present invention when more than half of the entire RBs of a system bandwidth are allocated to the first UE.

As shown in FIG. 25, a UE #1 to which 50 RBs are allocated can transmit data by spanning the RBs to the entire system bandwidth by applying slot hopping only. A UE #2 and a UE #3 to which 25 RBs are simultaneously allocated can satisfy the occupied bandwidth-related requirement by applying the aforementioned hopping method.

3.8 Method of Transmitting DMRS

According to the aforementioned hopping method, it is able to transmit uplink data by hopping the uplink data in a slot. Hence, a frequency domain in which uplink data is transmitted in a half slot of timing appearing before a symbol in which a DMRS is transmitted may be different from a frequency domain in which uplink data is transmitted in a half slot of timing appearing after the symbol in which a DMRS is transmitted. In particular, when a UE transmits uplink data to an eNB via a subframe including 2 slots, the uplink data can be transmitted via a different frequency resource in two half slots which are distinguished from other on the basis of a symbol in which a demodulation reference signal is transmitted. In the following, a method of transmitting a DMRS in the situation above is proposed. In this case, the uplink data and the DMRS can be transmitted on an unlicensed band.

3.8.1 First Method of Transmitting DMRS

According to the present invention, a first method of transmitting a DMRS corresponds to a method of transmitting a DMRS in an RB in which an uplink data is transmitted.

Figure 26:
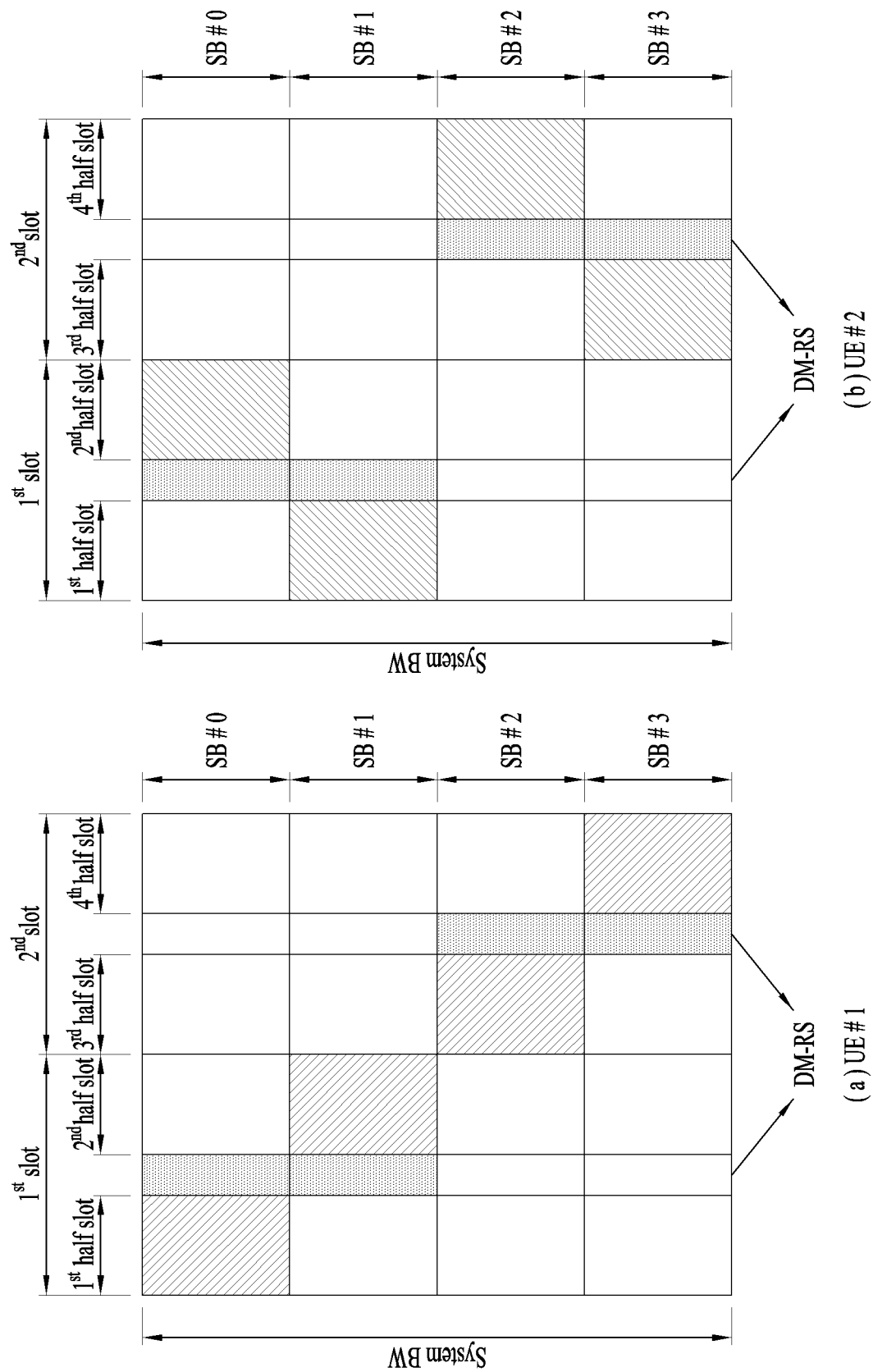
FIG. 26 is a diagram illustrating a first method of transmitting a DMRS according to the present invention.

FIG. 26 is a diagram illustrating a first method of transmitting a DMRS according to the present invention. In this case, assume that the hopping method mentioned earlier in FIG. 17 is applied in FIG. 26.

As shown in FIG. 26, all RBs belonging to an SB #0 are allocated to a UE #1 in a first half slot and the UE #1 transmits uplink data via a resource included in the SB #0. All RBs belonging to an SB #1 are allocated to the UE #1 in a second half slot and the UE #1 transmits uplink data via a resource included in the SB #1. Hence, the UE #1 transmits a DMRS of the first slot not only via a band of the SB #0 but also via a band of the SB #1.

According to the first DMRS transmission method, since a UE #2 transmits a DMRS on a frequency band identical to a frequency band of the UE #1, a problem may occur. In order to solve the problem, it may apply methods described in the following.

(1) It is able to (quasi-) orthogonally allocate a CS (cyclic shift), an OCC (orthogonal cover code), and the like of DMRSs applied to the UE #1 and the UE #2. By doing so, although DMRSs transmitted by the UE #1 and the UE #2 are multiplexed on the same frequency band, a base station receiving the DMRSs can be configured to distinguish the DMRSs from each other.

(2) It is able to configure orthogonality between DMRSs transmitted by two UEs to be guaranteed by allocating DMRS transmission in a form of a subcarrier unit comb. For example, a UE #1 can transmit a DMRS on an odd numbered subcarrier and a UE #2 can transmit a DMRS on an even numbered subcarrier. In this case, information on whether a UE transmit a DMRS via an odd numbered subcarrier or an even numbered subcarrier can be indicated via DCI. Or, the information can be configured via a predetermined rule based on an RB index or a UE ID assigned to each UE.

In terms of DMRS power, if an odd/even comb is applied, the DMRS power may become identical to uplink data power. If the odd/even comb is not applied (compared to SC-FDMA symbol of uplink data), power offset (e.g., 3 dB) (configured via predetermined physical layer signaling or RRC layer signaling) can be applied to a symbol in which the DMRS is transmitted.

3.8.2 Second Method of Transmitting DMRS

According to the present invention, a second method of transmitting a DMRS corresponds to a method of transmitting a DMRS in a subband including an RB in which an uplink data is transmitted.

Similar to the first DMRS transmission method, when a DMRS is transmitted in an RB to which uplink data is allocated only, if a size of RBs, which are allocated according to a UE, is not matched with a size of subbands, it may fail to guarantee orthogonality of a DMRS shared between UEs. In order to solve the problem, the present invention proposes a method of transmitting a DMRS to all subbands to which an RB belongs thereto.

Figure 27:
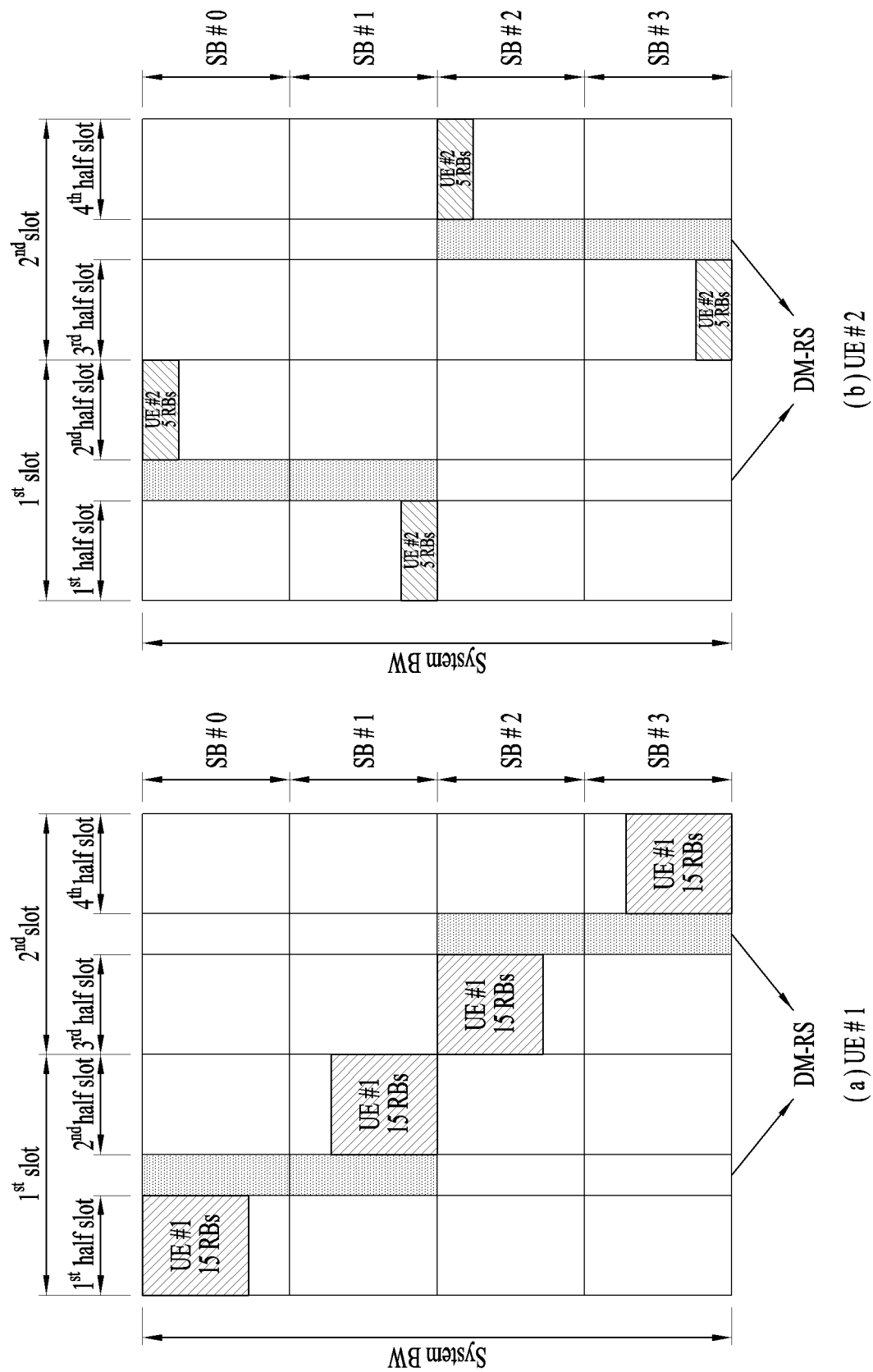
FIG. 27 is a diagram illustrating a second method of transmitting a DMRS according to the present invention.

FIG. 27 is a diagram illustrating a second method of transmitting a DMRS according to the present invention. In this case, assume that the hopping method mentioned earlier in FIG. 17 is applied in FIG. 27.

In this case, similar to the first DMRS transmission method, it is able to perform multiplexing on DMRSs transmitted by each UE in the same frequency band by (quasi-) orthogonally allocating a cyclic shift, an OCC (orthogonal cover code), and the like of a DMRS between UEs sharing the DMRS. And, it is able to configure orthogonality between DMRSs transmitted by each of UEs to be guaranteed by allocating DMRS transmission in a form of a subcarrier unit comb. If a comb is not applied, power offset (e.g., 3 dB) (configured via predetermined physical layer signaling or RRC layer signaling) can be applied to a symbol in which a DMRS is transmitted.

3.8.3 Third Method of Transmitting DMRS

According to the present invention, a third method of transmitting a DMRS corresponds to a method of transmitting a DMRS over a plurality of subbands.

Subbands on which a DMRS is transmitted can be configured in advance irrespective of an RB region in which uplink data is transmitted. For example, it may configure a DMRS to be always transmitted over the entire system bandwidth. Or, it may be able to configure a DMRS to be transmitted on an SB #0/1/2 in a first slot and configure a DMRS to be transmitted on an SB #1/2/3 in a second slot.

Or, it may be able to configure a DMRS to be transmitted over a plurality of subbands according to a frequency band to which uplink data transmitting RBs belong thereto. For example, when a UE is scheduled to transmit uplink data to an RB belonging to an SB #0 (or SB #1), the UE can transmit a DMRS via the SB #0 and the SB #1.

In this case, similar to the first DMRS transmission method, it is able to perform multiplexing on DMRSs transmitted by each UE in the same frequency band by (quasi-) orthogonally allocating a cyclic shift, an OCC (orthogonal cover code), and the like of a DMRS between UEs sharing the DMRS. And, it is able to configure orthogonality between DMRSs transmitted by each of UEs to be guaranteed by allocating DMRS transmission in a form of a subcarrier unit comb. If a comb is not applied, power offset (e.g., 3 dB) (configured via predetermined physical layer signaling or RRC layer signaling) can be applied to a symbol in which a DMRS is transmitted. Or, when a comb is not applied, the power offset can be applied to a symbol in which a DMRS is transmitted.

3.8.4 Fourth Method of Transmitting DMRS

According to the present invention, a fourth method of transmitting a DMRS corresponds to a method of independently configuring a DMRS according to a hopping unit (e.g., half slot, slot, etc.).

According to the aforementioned first to third DMRS transmission methods, since a symbol in which a DMRS is transmitted is shared between UEs or half slots (in the same UE), it may cause a DMRS power problem and a multiplexing problem between UEs. Hence, the present invention proposes a method of configuring an independent DMRS in a half slot. For example, it may be able to configure a specific SC-FDMA symbol belonging to a half slot to transmit a DMRS only without uplink data. Or, it may be able to configure a specific RE belonging to a half slot to transmit a DMRS and configure the remaining REs to transmit uplink data.

In summary, a UE can transmit a DMRS via a symbol transmitting a DMRS in each of slots. In this case, a frequency resource in which a demodulation reference signal is transmitted in each of slots can be determined based on a frequency resource in which uplink data is transmitted in each of slots. In particular, the frequency resource in which the demodulation reference signal is transmitted can be determined by a partial frequency band of a system bandwidth.

For example, as shown in FIG. 26, a system band includes a plurality of subbands and uplink data can be transmitted via subbands different from each other according to a half slot of a slot. In this case, a demodulation reference signal in a slot can be transmitted via a frequency resource identical to a frequency resource in which the uplink data is transmitted in a slot.

As a different example, as shown in FIG. 27, a system band includes a plurality of subbands and uplink data can be transmitted via a partial frequency band among subbands different from each other according to a half slot of a slot. In this case, a demodulation reference signal in a slot can be transmitted via a frequency resource identical to one or more subbands including a frequency resource in which the uplink data is transmitted in a slot.

Unlike a legacy method of transmitting uplink data via the same frequency according to a slot, according to the present invention, a UE can transmit the uplink data via subbands different from each other according to a half slot in a slot. In this case, when a frequency band on which a DMRS is transmitted is configured by the entire subbands on which uplink data is transmitted in a slot, since DMRS transmit power is different from uplink data transmit power, a UE according to the present invention can transmit the DMRS by boosting or elevating power for transmitting the DMRS. For example, the UE can boost the power for transmitting the DMRS according to a ratio of a frequency band in which the DMRS is transmitted (or a size of a frequency resource) to a uplink data frequency band in a half slot.

3.9 TDM (Time Division Multiplexing) Transmission

In the foregoing description, a method of performing hopping in a time unit shorter than a slot has been proposed to overcome a constraint that it is necessary for a node to occupy more than X % of a system bandwidth in transmitting a signal via an unlicensed band.

Unlikely, the present invention proposes a method of allocating a resource for transmitting uplink data to UEs in a unit of a pSF after a subframe is divided into a plurality of pSFs (partial subframes). And, when a UE transmits uplink data via a resource included in an allocated pSF, the present invention proposes a method of configuring the data to be transmitted by making the UE occupy the entire system bandwidth.

Figure 28:
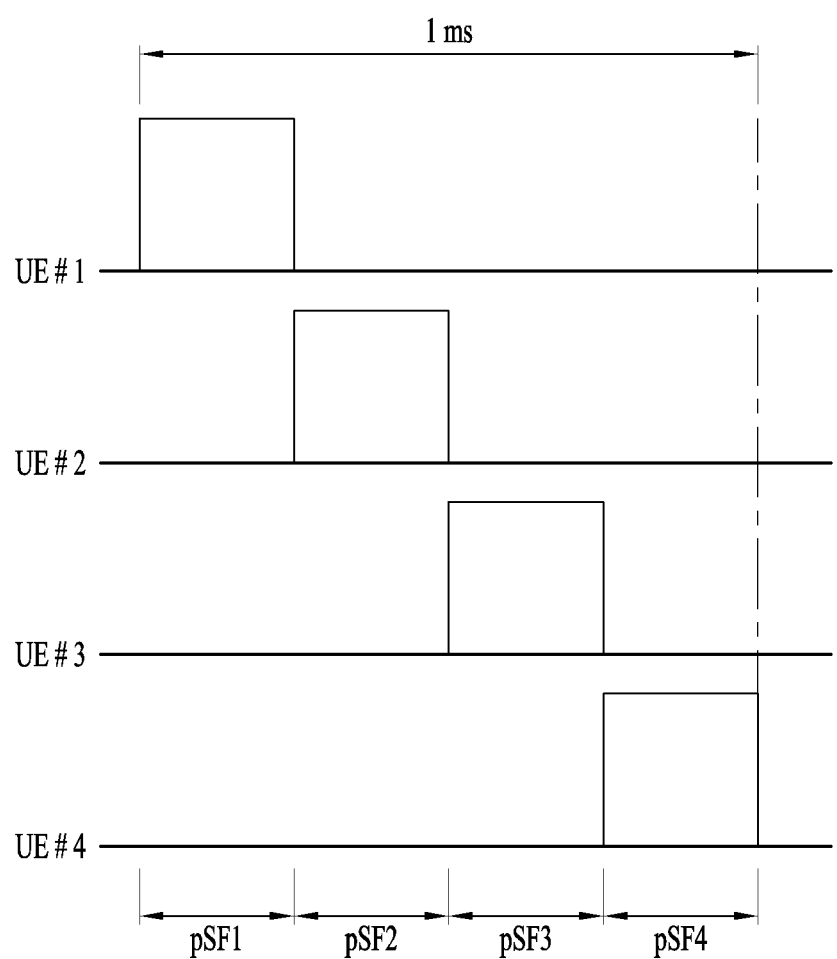
FIG. 28 is a diagram illustrating a method for a UE to transmit an uplink data when a subframe is divided into 4 partial subframes and each of the 4 partial subframes is allocated to each of 4 different UEs.

FIG. 28 is a diagram illustrating a method for a UE to transmit an uplink data when a subframe is divided into 4 partial subframes and each of the 4 partial subframes is allocated to each of 4 different UEs.

The proposed method has a merit in that it is able to transmit data by spanning the entire system bandwidth without a complex hopping method. However, due to an operation characteristic of a UE operating on an unlicensed band, the UE should perform an LBT procedure whenever the UE starts transmission in a new pSF. Hence, the proposed method has a demerit in that it is difficult to practically occupy a channel.

For example, in FIG. 28, when a UE #2 performs an LBT before a pSF2 starts to transmit data in the pSF2, since a UE #1 transmits data in a pSF1, the UE #2 determines that a channel is busy. Hence, data transmission in the pSF2 can be restricted.

In order to solve the problem above, it is necessary to design a pSF in consideration of LBT of a next pSF. Specifically, if the last SC-FDMA symbol of a pSF is emptied out or nulling is performed on a specific RB of a pSF, although LBT is performed for transmission of a next pSF, since a channel is determined as idle, it is able to transmit uplink data.

In the proposed method above, a base station can inform each of UEs of a scheduled pSF index via bitmap information to indicate a pSF allocated to each of the UEs. For example, when a system is configured by 4 pSFs, if a base station informs a specific UE of '1100' as bitmap information, the UE can recognize that uplink data is scheduled to a pSF1 and a pSF2. As a different method, the base station can inform each of UEs of a combination of (a starting pSF index, the number of scheduled pSFs). For example, if the base station informs a specific UE of a combination of (a starting pSF index corresponds to 2, the number of scheduled pSFs corresponds to 3), the UE is able to recognize that uplink data is scheduled to 3 contiguous pSFs ranging from a pSF2 to a pSF4. As a further different method, each of UEs can determine whether or not a pSF is scheduled in one subframe based on a combination of a UE ID, a subframe index, information configured via RRC signaling, and the like.

When a pSF in which uplink data is to be transmitted is determined according to each of UEs, each of the UEs transmits the data by spanning the entire system bandwidth. In this case, a size of a transport block to be transmitted can be determined by an RB size indicated by a UL grant and an MCS (modulation and coding scheme) level (under the assumption that the whole of one subframe is allocated).

If each UE transmits data in a unit of a pSF, a DMRS can be independently configured in each pSF. For example, it may be able to configure a specific SC-FDMA symbol included in a pSF to transmit a DMRS only without uplink data. Or, it may be able to configure a specific RE included in a pSF to transmit a DMRS and configure the remaining REs included in the pSF to transmit uplink data.

In this case, the number of pSFs divided from one subframe and a length of each pSF in time domain can be configured in advance or can be configured via RRC or physical layer signaling.

Since it is able to include the examples for the proposed method as one of implementation methods of the present invention, it is apparent that the examples are considered as a sort of proposed methods. Although the embodiments of the present invention can be independently implemented, the embodiments can also be implemented in a combined/aggregated form of a part of embodiments. It may define a rule that an eNB/location server informs a UE of information on whether to apply the proposed methods (or, information on rules of the proposed methods) via a predefined signal (e.g., physical layer signal or higher layer signal).

4. Device Configuration

Figure 29:
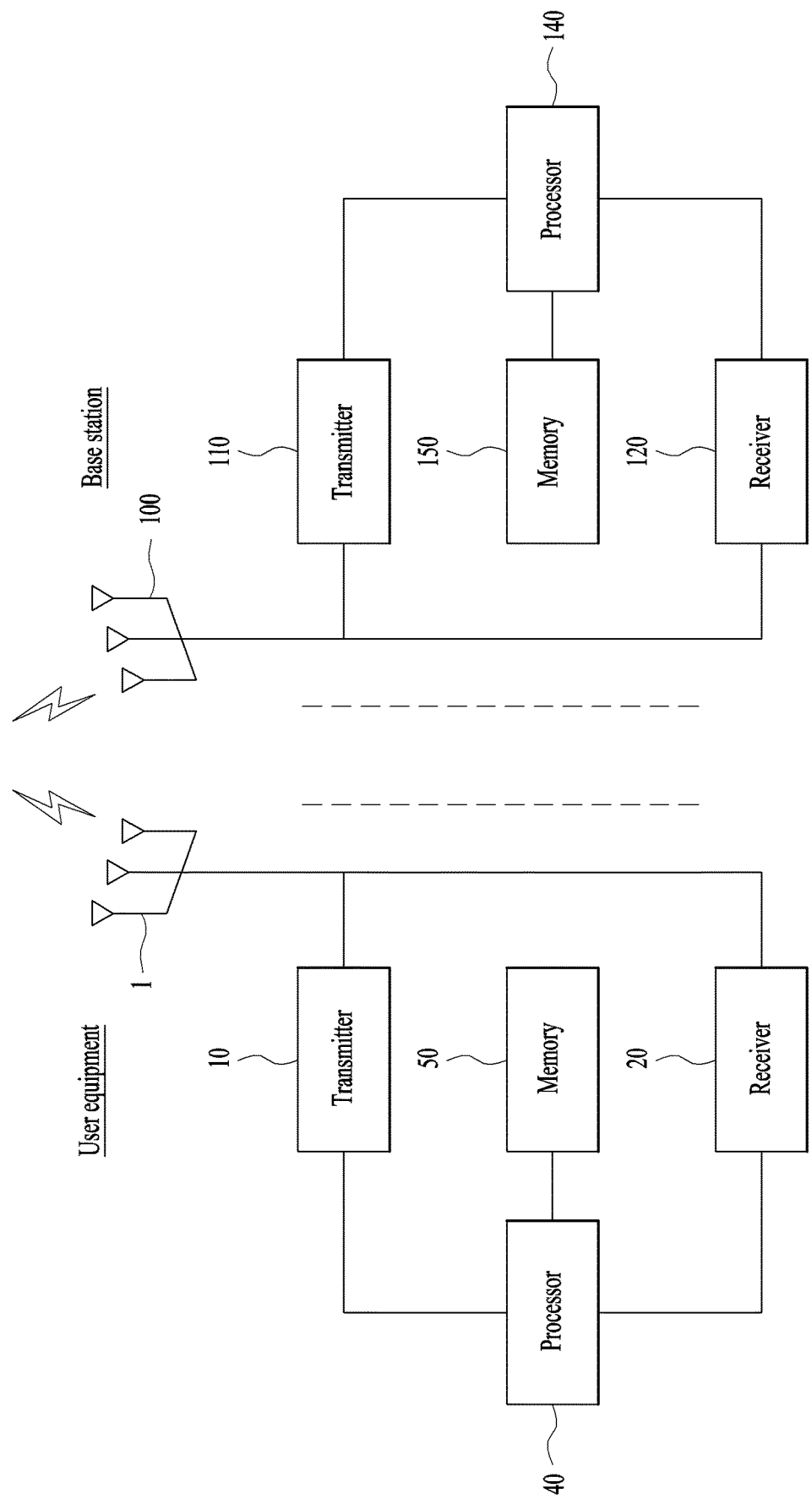
FIG. 29 is a diagram illustrating configurations of a UE and a base station in which proposed embodiments are implementable.

FIG. 29 is a diagram illustrating configurations of a UE and a base station capable of being implemented by the embodiments proposed in the present invention. The UE and the base station shown in FIG. 29 operate to implement the embodiments of a method of transmitting and receiving uplink data and a demodulation reference signal between the UE and the base station.

A UE 1 may act as a transmission end on a UL and as a reception end on a DL. A base station (eNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE receives first DL control information indicating whether a type of scheduling uplink signal transmission for one or more subframes corresponds to scheduling of a first type or scheduling of a second type from the base station via the processor 40. If the first DL control information indicates the scheduling of the first type, the UE can be configured to transmit an uplink signal in one or more subframes which are configured on the basis of the reception timing of the first DL control information. If the first DL control information indicates the scheduling of the second type, the UE can be configured to receive second DL control information indicating UL signal transmission for one or more subframes from the base station and transmit the uplink signal in one or more subframes which are configured on the basis of the reception timing of the second DL control information.

The base station transmits first DL control information indicating whether a type of scheduling uplink signal transmission for one or more subframes corresponds to scheduling of a first type or scheduling of a second type to the UE via the processor 140. If the first DL control information indicates the scheduling of the first type, the base station can be configured to receive an uplink signal in one or more subframes which are configured on the basis of the reception timing of the first DL control information. If the first DL control information indicates the scheduling of the second type, the base station can be configured to transmit second DL control information indicating UL signal transmission for one or more subframes to the UE and receive the uplink signal in one or more subframes which are configured on the basis of the reception timing of the second DL control information.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 29 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The embodiments of the present invention can be applied to various wireless access systems including 3GPP (3rd Generation Partnership Project) and 3GPP2 system. The embodiments of the present invention can be applied not only to various wireless access systems but also to all technical fields to which the various wireless access systems are applied. Further, the proposed method can also be applied to an mmWave communication system using ultra-high frequency band.

What is claimed is:

1. A method of transmitting an uplink signal, which is transmitted by a user equipment (UE) to a base station in a wireless communication system supporting an unlicensed band, the method comprising:
   transmitting an uplink data on a first time interval comprising two second time intervals,
   wherein each of the second time intervals comprises two third time intervals distinguished from each other based on a symbol in which a demodulation reference signal is transmitted, and
   wherein the uplink data is transmitted via frequency resources different from each other in the two third time intervals included in each of the second time intervals; and
   transmitting a demodulation reference signal on the symbol in which the demodulation reference signal is transmitted in each of the second time intervals,
   wherein a frequency resource in which the demodulation reference signal is transmitted in each of the second time intervals is determined based on a frequency resource in which the uplink data is transmitted in each of the second time intervals,
   wherein the frequency resource in which the demodulation reference signal is transmitted in each of the second time intervals corresponds to a partial frequency band among a system bandwidth, and
   wherein the uplink data is transmitted in a manner of being spanned over the system bandwidth with a ratio equal to or greater than a prescribed ratio in the first time interval.

2. The method of claim 1, wherein the system bandwidth comprises a plurality of subbands, and
   wherein the uplink data is transmitted via different subbands in each of the third time intervals in each of the second time intervals.

3. The method of claim 2, wherein the demodulation reference signal in each of the second time intervals is transmitted via a frequency resource identical to the frequency resource in which the uplink data in each of the second time intervals is transmitted.

4. The method of claim 1, wherein the system bandwidth comprises a plurality of subbands, and
   wherein the uplink data is transmitted via a partial frequency band among subbands different from each other per each of the third time intervals in each of the second time intervals.

5. The method of claim 4, wherein the demodulation reference signal in each of the second time intervals is transmitted via a frequency resource identical to one or more subbands containing the frequency resource in which the uplink data in each of the second time intervals is transmitted.

6. The method of claim 1, wherein the demodulation reference signal in each of the second time intervals is transmitted by power which is boosted according to a ratio of a partial frequency band in which the demodulation reference signal in each of the second time intervals is transmitted among the system bandwidth.

7. The method of claim 1, wherein when the demodulation reference signal is overlapped with a demodulation reference signal transmitted by a different UE in a time resource and a frequency resource, the demodulation reference signal is distinguished from the demodulation reference signal transmitted by the different UE via an OCC (orthogonal cover code).

8. The method of claim 1, wherein the uplink data and the demodulation reference signal in each of the second time intervals are transmitted through the unlicensed band.

9. A method of receiving an uplink signal, which is received by a base station from a user equipment (UE) in a wireless communication system supporting an unlicensed band, the method comprising:
   receiving an uplink data on a first time interval comprising two second time intervals,
   wherein each of the second time intervals comprises two third time intervals distinguished from each other based on a symbol in which a demodulation reference signal is transmitted, and
   wherein the uplink data is transmitted via frequency resources different from each other in the two third time intervals included in each of the second time intervals; and
   receiving a demodulation reference signal on the symbol in which the demodulation reference signal is transmitted in each of the second time intervals,
   wherein a frequency resource in which the demodulation reference signal is transmitted in each of the second time intervals is determined based on a frequency resource in which the uplink data is transmitted in each of the second time intervals,
   wherein the frequency resource in which the demodulation reference signal is transmitted in each of the second time intervals corresponds to a partial frequency band among a system bandwidth, and
   wherein the uplink data is transmitted in a manner of being spanned over the system bandwidth with a ratio equal to or greater than a prescribed ratio in the first time interval.

10. The method of claim 9, wherein the system bandwidth comprises a plurality of subbands, and
    wherein the uplink data is transmitted via different subbands in each of the third time intervals in each of the second time intervals.

11. The method of claim 10, wherein the demodulation reference signal in each of the second time intervals is transmitted via a frequency resource identical to the frequency resource in which the uplink data in each of the second time intervals is transmitted.

12. The method of claim 9, wherein the system bandwidth comprises a plurality of subbands, and
    wherein the uplink data is transmitted via a partial frequency band among subbands different from each other per each of the third time intervals in each of the second time intervals.

13. The method of claim 12, wherein the demodulation reference signal according to a half slot contained in each slot is transmitted via a frequency resource identical to one or more subbands containing the frequency resource in which the uplink data in each of the second time intervals is transmitted.

14. The method of claim 9, wherein the demodulation reference signal according to a half slot contained in each slot is transmitted by power which is boosted according to a ratio of a partial frequency band in which the demodulation reference signal in each of the second time intervals is transmitted among the system bandwidth.

15. The method of claim 9, wherein when the demodulation reference signal is overlapped with a demodulation reference signal transmitted by a different UE in a time resource and a frequency resource, the demodulation reference signal is distinguished from the demodulation reference signal transmitted by the different UE via an OCC (orthogonal cover code).

16. The method of claim 9, wherein the uplink data and the demodulation reference signal in each of the second time intervals are transmitted on the unlicensed band.

17. A user equipment for transmitting an uplink signal to a base station in a wireless communication system supporting an unlicensed band, the user equipment comprising:
a transmitter; and
a processor configured to operate in a manner of being connected with the transmitter, and configured to:
transmit an uplink data on a first time interval comprising two second time intervals,
wherein each of the second time intervals comprises two third time intervals distinguished from each other based on a symbol in which a demodulation reference signal is transmitted, and
wherein the uplink data is transmitted via frequency resources different from each other in the two third time intervals included in each of the second time intervals; and
transmit a demodulation reference signal on the symbol in which the demodulation reference signal is transmitted in each of the second time intervals,
wherein a frequency resource in which the demodulation reference signal is transmitted in each of the second time intervals is determined based on a frequency resource in which the uplink data is transmitted in each of the second time intervals, wherein the frequency resource in which the demodulation reference signal is transmitted in each of the second time intervals corresponds to a partial frequency band among a system bandwidth, and
wherein the uplink data is transmitted in a manner of being spanned over the system bandwidth with a ratio equal to or greater than a prescribed ratio in the first time interval.

18. A base station for receiving an uplink signal from a user equipment (UE) in a wireless communication system supporting an unlicensed band, the base station comprising:
a receiver; and
a processor configured to operate in a manner of being connected with the receiver, and configured to:
receive an uplink data on a first time interval comprising two second time intervals,
wherein each of the second time intervals comprises two third time intervals distinguished from each other on the basis of a symbol in which a demodulation reference signal is transmitted, and
wherein the uplink data is transmitted via frequency resources different from each other in the two third time intervals included in each of the second time interval; and
receive a demodulation reference signal on the symbol in which the demodulation reference signal is transmitted in each of the second time intervals,
wherein a frequency resource in which the demodulation reference signal is transmitted in each of the second time intervals is determined based on a frequency resource in which the uplink data is transmitted in each of the second time intervals,
wherein the frequency resource in which the demodulation reference signal contained is transmitted in each of the second time intervals corresponds to a partial frequency band among a system bandwidth, and
wherein the uplink data is transmitted in a manner of being spanned over the system bandwidth with a ratio equal to or greater than a prescribed ratio in the first time interval.

* * * * *